United States Patent
Park et al.

(10) Patent No.: US 12,022,073 B2
(45) Date of Patent: Jun. 25, 2024

(54) VIDEO ENCODING METHOD AND APPARATUS, AND VIDEO DECODING METHOD AND APPARATUS USING BLOCKS SPLIT IN VARIOUS SHAPES FROM IMAGES

(71) Applicant: SAMSUNG ELECTRONICS CO., LTD., Suwon-si (KR)

(72) Inventors: Minsoo Park, Suwon-si (KR); Minwoo Park, Suwon-si (KR); Heechul Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 17/426,981

(22) PCT Filed: Jan. 30, 2020

(86) PCT No.: PCT/KR2020/001418
§ 371 (c)(1),
(2) Date: Jul. 29, 2021

(87) PCT Pub. No.: WO2020/159250
PCT Pub. Date: Aug. 6, 2020

(65) Prior Publication Data
US 2022/0159252 A1 May 19, 2022

Related U.S. Application Data

(60) Provisional application No. 62/798,565, filed on Jan. 30, 2019.

(51) Int. Cl.
H04N 19/119 (2014.01)
H04N 19/14 (2014.01)
(Continued)

(52) U.S. Cl.
CPC ........... *H04N 19/119* (2014.11); *H04N 19/14* (2014.11); *H04N 19/146* (2014.11); *H04N 19/176* (2014.11)

(58) Field of Classification Search
None
See application file for complete search history.

(56) References Cited

U.S. PATENT DOCUMENTS

| 9,374,579 B2 | 6/2016 | Chen et al. |
| 2013/0251026 A1 | 9/2013 | Guo et al. |

(Continued)

FOREIGN PATENT DOCUMENTS

| EP | 2 725 798 A2 | 4/2014 |
| KR | 10-2013-0085391 A | 7/2013 |

(Continued)

OTHER PUBLICATIONS

International Search Report and Written Opinion dated May 11, 2020, issued by the International Searching Authority in counterpart International Application No. PCT/KR2020/001418 (PCT/ISA/220, 210, 237).

(Continued)

*Primary Examiner* — Xiaolan Xu
(74) *Attorney, Agent, or Firm* — Sughrue Mion, PLLC

(57) ABSTRACT

A video decoding method includes: determining a largest size of a coding unit and a smallest size of the coding unit by using information about the largest size of the coding unit and information about the smallest size of the coding unit, the information being obtained from a bitstream; obtaining, from the bitstream, information about a largest size of a block allowed to be ternary split and information about a smallest size of the block allowed to be ternary split, determining the largest size of the block allowed to be ternary split, determining the smallest size of the block (Continued)

allowed to be ternary split, determining whether to ternary split a current block, and decoding blocks generated by ternary splitting the current block.

3 Claims, 31 Drawing Sheets

(51) Int. Cl.
  *H04N 19/146* (2014.01)
  *H04N 19/176* (2014.01)

(56) References Cited

U.S. PATENT DOCUMENTS

| | | | |
|---|---|---|---|
| 2014/0341283 A1 | 11/2014 | Choi et al. | |
| 2016/0309156 A1* | 10/2016 | Park | H04N 19/597 |
| 2017/0347128 A1 | 11/2017 | Panusopone et al. | |
| 2020/0204799 A1* | 6/2020 | Lee | H04N 19/11 |
| 2021/0144371 A1 | 5/2021 | Park et al. | |

FOREIGN PATENT DOCUMENTS

| | | |
|---|---|---|
| KR | 10-1617336 B1 | 5/2016 |
| KR | 10-2019-0005730 A | 1/2019 |
| WO | 2019/009502 A1 | 1/2019 |
| WO | 2019/009540 A1 | 1/2019 |

OTHER PUBLICATIONS

Bross, Benjamin et al., "Versatile Video Coding(draft 3)", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L1001-v7. (223 pages total).

Communication dated Feb. 23, 2023 by the Korean Intellectual Property Office in Korean Patent Application No. 10-2021-7012765.

Communication dated Apr. 19, 2023 by the Intellectual Property Office of India in counterpart Indian Patent Application No. 202127034624.

Shih-Ta Hsiang et al., "CE1.7.0.1:Signaling maximum CU size for BT/TT split," Joint Video Experts Team (JVET) of ITU-T SG 16 WP 3 and ISO/IEC JTC 1/SC 29/WG 11, Jul. 2018 XP030195807,(3 total pages).

Minsoo Park et al., "[EVC] Suggested improvements for EVC DIS," International Organisation for Standardisation Organisation Internationale Normalisation ISO/IEC JTC1/SC29/WG11 Coding of Moving Pictures and Audio, PMEG2020/M52166, Jan. 2020, XP030224786, (16 Total Pages).

European Search Report, dated Nov. 23, 2022, issued by the European Patent Office, Application No. 20748183.9.

Notice of Allowance issued on Feb. 26, 2024 by Korean Intellectual Property Office in Korean Application No. 10-2023-7040337.

* cited by examiner

FIG. 4
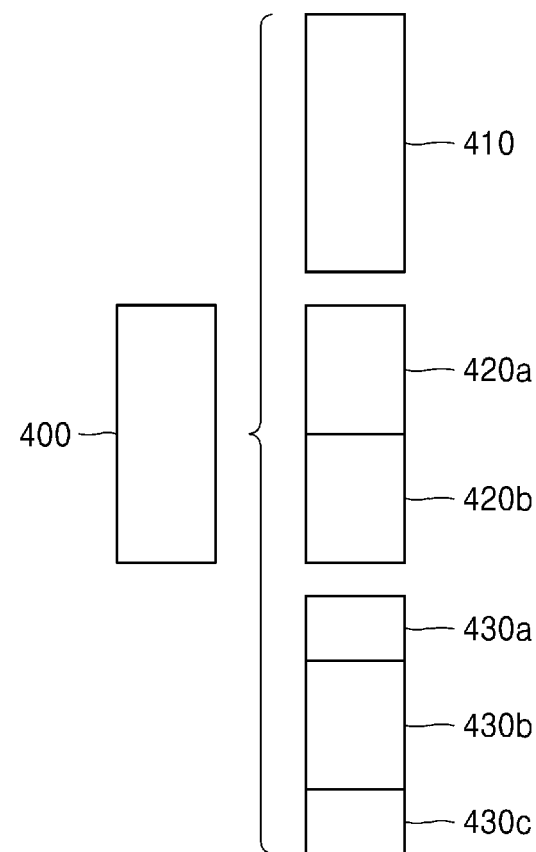
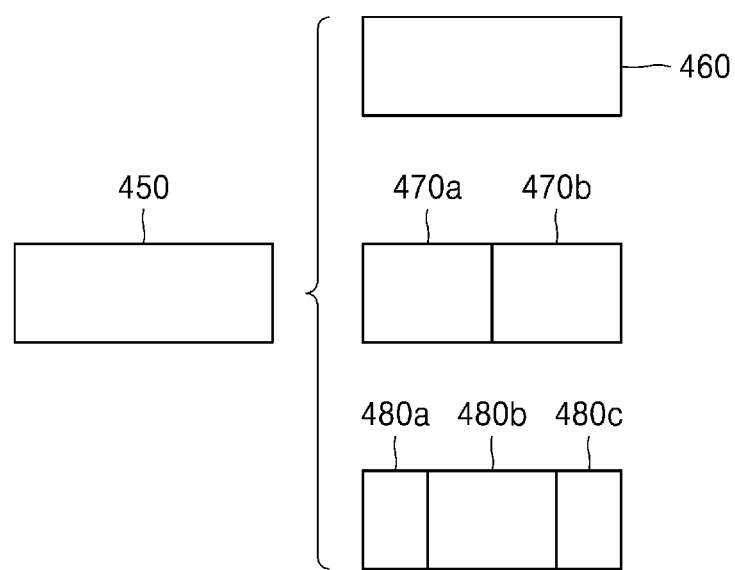

FIG. 13

| BLOCK SHAPE DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 21

| | Block Ratio | Largest Size (Size of Long Side) | Smallest Size (Size of Long Side) | Available Block Shapes |
|---|---|---|---|---|
| Size of Block Allowed According to Block Ratio | 1:1 | 128 | 4 | 128x128, 64x64, 32x32, 16x16, 8x8, 4x4 |
| | 1:2 | 128 | 8 | 128x64, 64x128, 64x32, 32x64, 32x16, 16x32, 16x8, 8x16, 8x4, 4x8 |
| | 1:4 | 64 | 16 | 64x16, 16x64, 32x8, 8x32, 16x4, 4x16 |
| | 1:8 | 64 | 32 | 64x8, 8x64, 32x4, 4x32 |
| Size of Block to which Split Shape is Applicable | Binary Split | 128 | 8 | 128x64+128x64, ⋯ , 8x4+8x4, 4x4+4x4 |
| | Ternary Split | 64 | 16 | 16x64+32x64+16x64, ⋯, 4x4+8x4+4x4 |

FIG. 22

| Block Ratio | Largest Size (Size of Long Side) | Smallest Size (Size of Long Side) | Value of Information about Largest Size | Value of Information about Smallest Size |
|---|---|---|---|---|
| 1:1 | 128 | 4 | 5 | 0 |
| 1:2 | 128 | 8 | 5 | 0 |
| 1:4 | 64 | 16 | 4 | 0 |
| Binary Split | 128 | 8 | 5 | 0 |
| Ternary Split | 64 | 16 | 4 | 0 |

FIG. 23

| Block Ratio | Largest Size (Size of Long Side) | Smallest Size (Size of Long Side) | Value of Information about Largest Size | Value of Information about Smallest Size |
|---|---|---|---|---|
| 1:1 | 128 | 4 | 0 | 0 |
| 1:2 | 64 | 8 | 1 | 0 |
| 1:4 | 64 | 16 | 1 | 0 |
| Binary Split | 128 | 8 | 0 | 0 |
| Ternary Split | 64 | 16 | 1 | 0 |

FIG. 24

| Block Ratio | Largest Size (Size of Long Side) | Smallest Size (Size of Long Side) | Value of Information about Largest Size | Value of Information about Smallest Size |
|---|---|---|---|---|
| 1:1 | 128 | 4 | 0 | 0 |
| 1:2 | 64 | 8 | 1 | 0 |
| 1:4 | 64 | 16 | 0 | 0 |
| Binary Split | 128 | 8 | 0 | 0 |
| Ternary Split | 64 | 16 | 1 | 0 |

FIG. 25

| |
|---|
| seq_parameter_set_rbsp( ) { |
| ... |
|   sps_btt_flag |
|   if( sps_btt_flag ) |
|     log2_ctu_size_minus2 |
|     log2_diff_ctu_max_11_cb_size |
|     log2_diff_max_11_min_11_cb_size |
|     log2_diff_max_11_max_12_cb_size |
|     log2_diff_min_11_min_12_cb_size_minus1 |
|     log2_diff_max_12_max_14_cb_size |
|     log2_diff_min_12_min_14_cb_size_minus1 |
|     log2_diff_max_11_max_tt_cb_size |
|     log2_diff_min_11_min_tt_cb_size_minus2 |
|   } |
|   sps_suco_flag |
|   if(sps_suco_flag) { |
|     log2_diff_ctu_size_max_suco_cb_size |
|     log2_diff_max_suco_min_suco_c b_size |
|   } |
| ... |
| } |

FIG. 26

CtbLog2SizeY = log2_ctu_size_minus2 + 2

CtbSizeY = 1 << CtbLog2SizeY

MinCbLog2SizeY = 2

MinCbSizeY = 1 << MinCbLog2SizeY

PicWidthInCtbsY = Ceil( pic_width_in_luma_samples ÷ CtbSizeY )

PicHeightInCtbsY = Ceil( pic_height_in_luma_samples ÷ CtbSizeY )

PicSizeInCtbsY = PicWidthInCtbsY * PicHeightInCtbsY

PicWidthInMinCbsY = pic_width_in_luma_samples / MinCbSizeY

PicHeightInMinCbsY = pic_height_in_luma_samples / MinCbSizeY

PicSizeInMinCbsY = PicWidthInMinCbsY * PicHeightInMinCbsY

PicSizeInSamplesY = pic_width_in_luma_samples * pic_height_in_luma_samples

PicWidthInSamplesC = pic_width_in_luma_samples / SubWidthC

PicHeightInSamplesC = pic_height_in_luma_samples / SubHeightC

FIG. 27

MaxCbLog2Size11Ratio = CtbLog2SizeY − log2_diff_ctu_max_11_cb_size

MinCbLog2Size11Ratio = MaxCbLog2Size11Ratio − log2_diff_max_11_min_11_cb_size

MaxCbLog2Size12Ratio = MaxCbLog2Size11Ratio − log2_diff_max_11_max_12_cb_size

MinCbLog2Size12Ratio = MinCbLog2Size11Ratio + log2_diff_min_11_min_12_cb_size_minus1 + 1

MaxCbLog2Size14Ratio = MaxCbLog2Size12Ratio − log2_diff_max_12_max_14_cb_size

MinCbLog2Size14Ratio = MinCbLog2Size12Ratio + log2_diff_min_12_min_14_cb_size_minus1 + 1

MaxTtLog2Size = MaxCbLog2Size11Ratio − log2_diff_max_11_max_tt_cb_size

MinTtLog2Size = MinCbLog2Size11Ratio + log2_diff_min_11_min_tt_cb_size_minus2 + 2

FIG. 28

MaxSucoLog2Size = CtbLog2SizeY − log2_diff_ctu_size_max_suco_cb_size

MinSucoLog2Size = MaxSucoLog2Size − log2_diff_max_suco_min_suco_cb_size

FIG. 29

| |
|---|
| seq_parameter_set_rbsp( ) { |
| ... |
|   sps_btt_flag |
|   if( sps_btt_flag ) |
|     log2_ctu_size_minus5 |
|     log2_min_cb_size_minus2 |
|     log2_diff_ctu_max_14_cb_size |
|     log2_diff_ctu_max_tt_cb_size |
|     log2_diff_min_cb_min_tt_cb_size_minus2 |
| ... |
|   } |

FIG. 30

CtbLog2SizeY = log2_ctu_size_minus5 + 5

CtbSizeY = 1 << CtbLog2SizeY

PicWidthInCtbsY = Ceil( pic_width_in_luma_samples ÷ CtbSizeY )

PicHeightInCtbsY = Ceil( pic_height_in_luma_samples ÷ CtbSizeY )

PicSizeInCtbsY = PicWidthInCtbsY * PicHeightInCtbsY

PicWidthInMinCbsY = pic_width_in_luma_samples / MinCbSizeY

PicHeightInMinCbsY = pic_height_in_luma_samples / MinCbSizeY

PicSizeInMinCbsY = PicWidthInMinCbsY * PicHeightInMinCbsY

PicSizeInSamplesY = pic_width_in_luma_samples * pic_height_in_luma_samples

PicWidthInSamplesC = pic_width_in_luma_samples / SubWidthC

PicHeightInSamplesC = pic_height_in_luma_samples / SubHeightC

MinCbLog2SizeY = 2 + log2_min_cb_size_minus2

MinCbSizeY = 1 << MinCbLog2SizeY

PicWidthInMinCbsY = pic_width_in_luma_samples / MinCbSizeY

PicHeightInMinCbsY = pic_height_in_luma_samples / MinCbSizeY

PicSizeInMinCbsY = PicWidthInMinCbsY * PicHeightInMinCbsY

FIG. 31

MinCbLog2Size11Ratio = MinCbLog2SizeY

MinCbLog2Size12Ratio = MinCbLog2Size11Ratio + 1

MinCbLog2Size14Ratio = MinCbLog2Size12Ratio + 1

MaxTtLog2Size = Min( CtbLog2SizeY − log2_diff_ctu_max_tt_cb_size, 6 )

MinTtLog2Size = MinCbLog2SizeY + log2_diff_min_cb_min_tt_cb_size_minus2 + 2

VIDEO ENCODING METHOD AND APPARATUS, AND VIDEO DECODING METHOD AND APPARATUS USING BLOCKS SPLIT IN VARIOUS SHAPES FROM IMAGES

CROSS-REFERENCE TO RELATED APPLICATION(S)

This application is a National Stage Entry of PCT International Application No. PCT/KR2020/001418 filed on Jan. 30, 2020, which is based on and claims priority to U.S. Provisional Application No. 62/798,565 filed on Jan. 30, 2019, in the United States Patent and Trademark Office, the disclosures of which are incorporated by reference herein in their entirety.

BACKGROUND

1. Field

The disclosure relates to the field of encoding and decoding an image, and more particularly, to methods and apparatuses for encoding and decoding videos by splitting an image into blocks of various shapes.

2. Description of Related Art

In a general compression method, square coding units are determined through recursive splitting processes in which whether to split a coding unit included in a picture is determined while determining a size of the coding unit and then the coding unit is uniformly split into four coding units of the same size. However, recently, image quality deterioration of a reconstructed image caused by the use of coding units having the uniform shape of a square for a high-resolution image has become a problem. Accordingly, methods and apparatuses for splitting a high-resolution image into coding units of various shapes have been proposed.

The present disclosure provides an encoding method and apparatus, and a decoding method and apparatus for effectively signaling syntax elements regarding sizes of coding units of various shapes.

SUMMARY

Provided are methods and apparatuses for encoding and decoding videos by splitting an image into blocks of various shapes. A technical problem is to efficiently signal information about a split method of blocks between a video encoding apparatus and a video decoding apparatus such that an encoded video is decoded by using blocks split into various shapes from an image, according to one or more embodiments.

According to an aspect of the disclosure, a video decoding method includes: determining a largest size of a coding unit and a smallest size of the coding unit, by using information about the largest size of the coding unit, the information being obtained from a bitstream; obtaining, from the bitstream, information about a largest size of a block allowed to be ternary split and information about a smallest size of the block allowed to be ternary split; determining the largest size of the block allowed to be ternary split, by using the largest size of the coding unit and the information about the largest size of the block allowed to be ternary split; determining the smallest size of the block allowed to be ternary split, by using the smallest size of the coding unit and the information about the smallest size of the block allowed to be ternary split; determining whether to ternary split a current block, based on the largest size of the block allowed to be ternary split and the smallest size of the block allowed to be ternary split; and decoding blocks generated by ternary splitting the current block.

The determining of the largest size of the block allowed to be ternary split may include determining the largest size of the block allowed to be ternary split, based on a value obtained by subtracting the information about the largest size of the block allowed to be ternary split from the largest size of the coding unit, and the determining of the smallest size of the block allowed to be ternary split may include determining the smallest size of the block allowed to be ternary split, based on a value obtained by adding the information about the smallest size of the block allowed to be ternary split to the smallest size of the coding unit.

The current block may not be allowed to be ternary split, when a size of the current block is greater than the largest size of the block allowed to be ternary split or smaller than the smallest size of the block allowed to be ternary split.

The video decoding method may further include: obtaining, from the bitstream, information about a largest size of a second coding unit in which a length to width ratio of a block is 1:4; determining the largest size of the second coding unit based on a value obtained by subtracting the information about the largest size of the second coding unit from the largest size of the coding unit; and decoding the second coding unit by using the largest size of the second coding unit.

The video decoding method may further include: obtaining, from the bitstream, information about a smallest size of the coding unit; and determining the smallest size of the coding unit based on a value obtained by adding 2 to a value indicated by the information about the smallest size of the coding unit.

The video decoding method may further include determining a largest size of a first coding unit in which a length to width ratio of a block is 1:1 to be the same as the largest size of the coding unit.

The video decoding method may further include: obtaining, from the bitstream, information about a smallest size of the coding unit; determining the largest size of the block allowed to be ternary split, based on a value obtained by subtracting the information about the largest size of the block allowed to be ternary split from the largest size of the coding unit; determining the smallest size of the block allowed to be ternary split, based on a value obtained by adding the information about the smallest size of the block allowed to be ternary split to the smallest size of the coding unit; determining whether to ternary split the current block, based on the largest size of the block allowed to be ternary split and the smallest size of the block allowed to be ternary split; and decoding the blocks generated by ternary splitting the current block.

According to an aspect of the disclosure, a video decoding apparatus includes: an obtainer configured to obtain, from a bitstream, information about a largest size of a block allowed to be ternary split and information about a smallest size of the block allowed to be ternary split; and a decoder configured to determine a largest size of a coding unit by using information about the largest size of the coding unit, the information being obtained from the bitstream, determine the largest size of the block allowed to be ternary split by using the largest size of the coding unit and the information about the largest size of the block allowed to be ternary split, determine the smallest size of the block allowed to be ternary split by using the smallest size of the coding unit and the information about the smallest size of the block allowed to be ternary split, determine whether to ternary split a current block, based on the largest size of the block allowed to be ternary split and the smallest size of the block allowed to be ternary split, and decode blocks generated by ternary splitting the current block.

The largest size of the block allowed to be ternary split may be determined based on a value obtained by subtracting the information about the largest size of the block allowed to be ternary split from the largest size of the coding unit, and the smallest size of the block allowed to be ternary split is determined based on a value obtained by adding the information about the smallest size of the block allowed to be ternary split to the smallest size of the coding unit.

The current block may not be allowed to be ternary split, when a size of the current block is greater than the largest size of the block allowed to be ternary split or smaller than the smallest size of the block allowed to be ternary split.

The obtainer may be further configured to obtain, from the bitstream, information about a largest size of a second coding unit in which a length to width ratio of a block is 1:4, and the decoder may be further configured to determine the largest size of the second coding unit based on a value obtained by subtracting the information about the largest size of the second coding unit from the largest size of the coding unit, and decode the second coding unit by using the largest size of the second coding unit.

The obtainer may be further configured to obtain, from the bitstream, information about a smallest size of the coding unit, and the decoder may be further configured to determine the smallest size of the coding unit based on a value obtained by adding 2 to a value indicated by the information about the smallest size of the coding unit.

According to an aspect of the disclosure, a video encoding method includes: determining a largest size of a coding unit, a smallest size of the coding unit, a largest size of a block allowed to be ternary split, and a smallest size of the block allowed to be ternary split; determining whether to ternary split a current block, based on the largest size of the block allowed to be ternary split and the smallest size of the block allowed to be ternary split, and encoding blocks generated by ternary splitting the current block; encoding information about the largest size of the coding unit, based on the largest size of the coding unit; encoding information about the largest size of the block allowed to be ternary split, by using the largest size of the coding unit and the largest size of the block allowed to be ternary split; and encoding information about the smallest size of the block allowed to be ternary split, by using the smallest size of the coding unit and the smallest size of the block allowed to be ternary split.

The video encoding method may further include: encoding the information about the largest size of the block allowed to be ternary split, based on a value obtained by subtracting the largest size of the block allowed to be ternary split from the largest size of the coding unit; and encoding the information about the smallest size of the block allowed to be ternary split, based on a value obtained by subtracting the smallest size of the block allowed to be ternary split from the smallest size of the coding unit.

In the video encoding method, the current block may not be allowed to be ternary split when a size of the current block is greater than the largest size of the block allowed to be ternary split or smaller than the smallest size of the block allowed to be ternary split.

The information about the smallest size of the block allowed to be ternary split may correspond to a value of a difference between the smallest size of the coding unit and the smallest size of the block allowed to be ternary split.

The decoder may be further configured to determine a largest size of a first coding unit in which a length to width ratio of a block is 1:1 to be the same as the largest size of the coding unit.

A computer-readable recording medium has recorded thereon a program for implementing, on a computer, a video decoding method according to an embodiment.

A computer-readable recording medium has recorded thereon a program for implementing, on a computer, a video encoding method according to an embodiment.

According to one or more embodiments of the present disclosure, a video encoding apparatus and a video decoding apparatus can perform encoding and decoding by setting information about a largest size or smallest size of various blocks because bit amounts for encoding and decoding information about a largest size and a smallest size of a block for each block ratio and information about a largest size and a smallest size of a block according to a split shape can be reduced.

However, effects achievable by encoding and decoding methods using a tile and a picture, and encoding and decoding apparatuses using a tile and a picture, according to an embodiment, are not limited to those mentioned above, and other effects that not mentioned could be clearly understood by one of ordinary skill in the art from the following description.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 illustrates a process, performed by an image decoding apparatus, of determining at least one coding unit by splitting a non-square coding unit, according to an embodiment;

FIG. 13 illustrates a process of determining a depth of a coding unit as a shape and size of the coding unit change, when the coding unit is recursively split such that a plurality of coding units are determined, according to an embodiment;

FIG. 21 shows shapes of blocks allowable in a block split tree structure, according to an embodiment;

FIG. 22 shows information about a largest size and smallest size of a block determined according to a block ratio, according to an embodiment;

FIG. 23 shows information about a largest size and smallest size of a block determined according to a block ratio, according to another embodiment;

FIG. 24 shows information about a largest size and smallest size of a block determined according to a block ratio, according to another embodiment;

FIG. 25 shows syntax elements for signaling information about a largest size and smallest size of a block, according to an embodiment;

FIG. 26 shows relational equations for determining a size/number of largest blocks and a size/number of smallest blocks, determined according to the syntax elements of FIG. 25;

FIG. 27 shows relational equations for determining largest sizes and smallest sizes of blocks according to block ratios, according to the syntax elements of FIG. 25;

FIG. 28 shows relational equations for determining largest sizes and smallest sizes of blocks on which a split unit coding unit (SUCO) is performed according to the syntax elements of FIG. 25;

FIG. 29 shows syntax elements for signaling information about a largest size and smallest size of a block, according to another embodiment;

FIG. 30 shows relational equations for determining a size/number of largest blocks and a size/number of smallest blocks, determined according to the syntax elements of FIG. 29; and FIG. 31 shows relational equations for determining largest sizes and smallest sizes of blocks according to block ratios, according to the syntax elements of FIG. 29.

DETAILED DESCRIPTION

Figure 1:
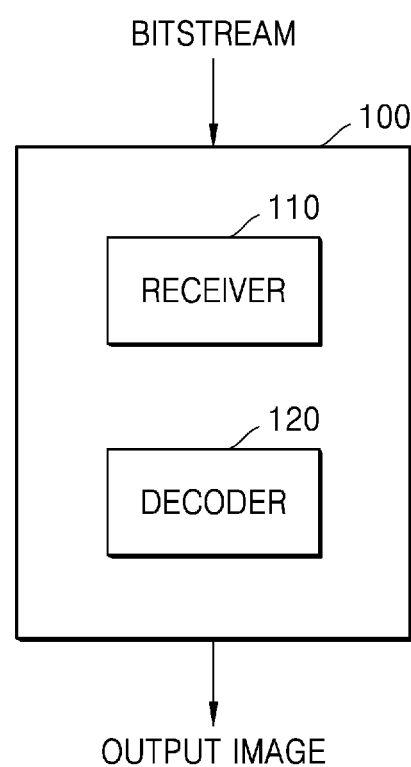
FIG. 1 is a schematic block diagram of an image decoding apparatus according to an embodiment.

As the present disclosure allows for various changes and numerous examples, particular embodiments will be illustrated in the drawings and described in detail in the written description. However, this is not intended to limit the present disclosure to particular modes of practice, and it will be understood that all changes, equivalents, and substitutes that do not depart from the spirit and technical scope of the present disclosure are encompassed in the present disclosure.

In the description of embodiments, certain detailed explanations of related art are omitted when it is deemed that they may unnecessarily obscure the essence of the present disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image of a video or a moving image, i.e., the video itself.

Also, in the present specification, a 'sample' denotes data assigned to a sampling position of an image, i.e., data to be processed. For example, pixel values of an image in a spatial domain and transform coefficients on a transform region may be samples. A unit including at least one such sample may be defined as a block.

Also, in the present specification, a 'current block' may denote a block of a largest coding unit, a coding unit, a prediction unit, or a transform unit of a current image to be encoded or decoded.

In the present specification, a motion vector in a list 0 direction may denote a motion vector used to indicate a block in a reference picture included in a list 0, and a motion vector in a list 1 direction may denote a motion vector used to indicate a block in a reference picture included in a list 1. Also, a motion vector in a unidirection may denote a motion vector used to indicate a block in a reference picture included in a list 0 or list 1, and a motion vector in a bidirection may denote that the motion vector includes a motion vector in a list 0 direction and a motion vector in a list 1 direction.

Hereinafter, an image encoding apparatus and an image decoding apparatus, and an image encoding method and an image decoding method according to embodiments will be described with reference to FIGS. 1 through 16. A method of determining a data unit of an image, according to an embodiment, will be described with reference to FIGS. 3 through 16, and a video encoding/decoding method using a tile and tile group, according to an embodiment, will be described with reference to FIGS. 17 through 28.

Hereinafter, a method and apparatus for adaptive selection based on various shapes of coding units, according to an embodiment of the present disclosure, will be described with reference to FIGS. 1 and 2.

FIG. 1 is a schematic block diagram of an image decoding apparatus according to an embodiment.

An image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 1700 described later. Also, the bitstream may be transmitted from the image encoding apparatus 1700. The image encoding apparatus 1700 and the image decoding apparatus 100 may be connected by wire or wirelessly, and the receiver 110 may receive the bitstream by wire or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
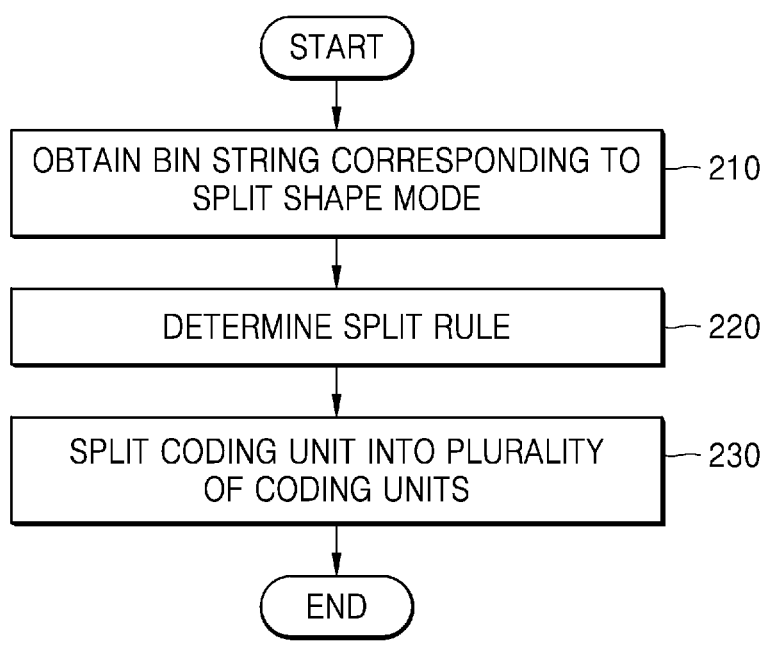
FIG. 2 is a flowchart of an image decoding method according to an embodiment.

FIG. 2 is a flowchart of an image decoding method according to an embodiment.

According to an embodiment of the present disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of the coding unit (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a height to width ratio of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the present disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding unit (CTB) denotes an N×N block including N×N samples (N is an integer). Each color component may be split into one or more largest coding blocks.

When a picture includes three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of monochrome samples and syntax structures used to encode the monochrome samples. When a picture is a picture encoded in color planes separated according to color components, a largest coding unit includes the picture and syntax structures used to encode samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of monochrome samples and syntax structures used to encode the monochrome samples. When a picture is a picture encoded in color planes separated according to color components, a coding unit includes the picture and syntax structures used to encode samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the present disclosure is not limited thereto.

For example, information about a largest size of a luma coding block may be obtained from a bitstream. For example, the largest size of the luma coding block indicated by the information about the largest size of the luma coding block may be one of 4×4, 8×8, 16×16, 32×32, 64×64, 128×128, and 256×256.

For example, information about a luma block size difference and a largest size of a luma coding block that may be split into two may be obtained from a bitstream. The information about the luma block size difference may refer to a size difference between a luma largest coding unit and a largest luma coding block that may be split into two. Accordingly, when the information about the largest size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a largest size of a luma coding block that is binary splittable is obtained from a bitstream, the largest size of the luma coding block that is binary splittable may be variably determined. In contrast, a largest size of a luma coding block that is ternary splittable may be fixed. For example, the largest size of the luma coding block that is ternary splittable in an !-picture may be 32×32, and the largest size of the luma coding block that is ternary splittable in a P-picture or a B-picture may be 64×64.

Also, a largest coding unit may be hierarchically split into coding units based on split shape mode information obtained from a bitstream. At least one of information indicating whether to perform quad splitting, information indicating whether to perform multi-splitting, split direction information, or split type information may be obtained as the split shape mode information from the bitstream.

For example, the information indicating whether to perform quad splitting may indicate whether a current coding unit is to be quad split (QUAD_SPLIT) or not.

When the current coding unit is not quad split, the information indicating whether to perform multi-splitting may indicate whether the current coding unit is to be no longer split (NO_SPLIT) or to be binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. When the current coding unit is binary split in the horizontal direction, the split mode may be determined to be a binary horizontal split mode (SPLIT_BTHOR), when the current coding unit is ternary split in the horizontal direction, the split mode may be determined to be a ternary horizontal split mode (SPLIT_TT_HOR), when the current coding unit is binary split in the vertical direction, the split mode may be determined to be a binary vertical split mode (SPLIT_BT_VER), and when the current coding unit is ternary split in the vertical direction, the split mode may be determined to be a ternary vertical split mode SPLIT_BT_VER.

The image decoding apparatus 100 may obtain, from the bitstream, the bin string of the split shape mode information. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or the same as the largest coding unit. For example, because the largest coding unit is a coding unit having a largest size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and the prediction block may not be related to each other.

In another embodiment, prediction may be performed by using a coding unit as a prediction unit. Also, transform may be performed by using a coding unit as a transform block.

The splitting of the coding unit will be described in detail with reference to FIGS. 3 through 16. A current block and a neighboring block of the present disclosure may indicate one of the largest coding unit, the coding unit, the prediction block, and the transform block. Also, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of lower left, left, upper left, top, upper right, right, lower right of the current block.

Figure 3:
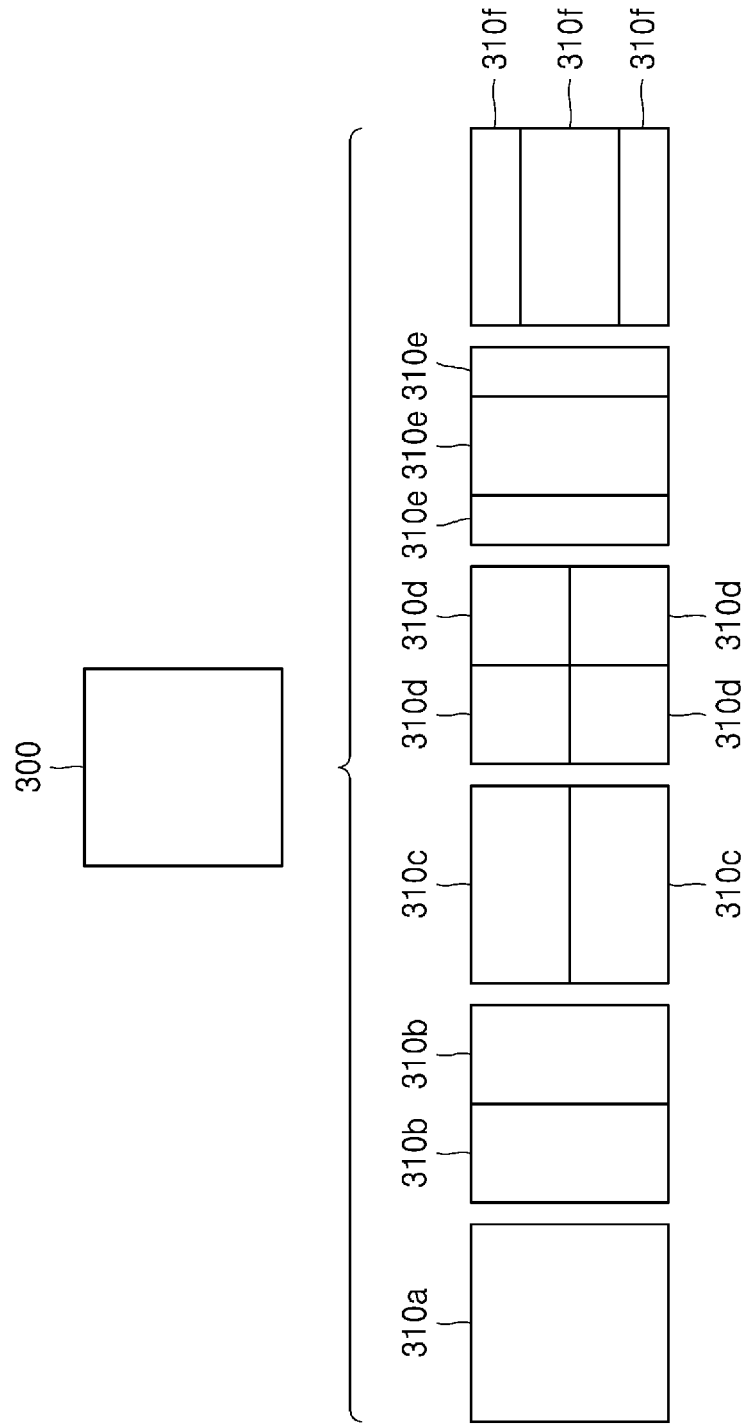
FIG. 3 illustrates a process, performed by an image decoding apparatus, of determining at least one coding unit by splitting a current coding unit, according to an embodiment.

FIG. 3 illustrates a process, performed by an image decoding apparatus, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a height to width ratio, or a size of a coding unit.

The shape of the coding unit may include a square and a non-square. When the lengths of the width and the height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the height to width ratio among the block shape information of the coding unit to be at least one of 1:2, 2:1, 1:4, 4:1, 1:8, 8:1, 1:16, 16:1, 1:32, or 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 1700 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "no split". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "no split" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310*a* having the same size as the current coding unit 300, based on the split shape mode information indicating no split, or may determine coding units 310*b*, 310*c*, 310*d*, 310*e*, or 310*f* split based on the split shape mode information indicating a certain splitting method.

Referring to FIG. 3, according to an embodiment, the image decoding apparatus 100 may determine two coding units 310*b* obtained by splitting the current coding unit 300 in a vertical direction, based on the split shape mode information indicating to perform splitting in a vertical direction. The image decoding apparatus 100 may determine two coding units 310*c* obtained by splitting the current coding unit 300 in a horizontal direction, based on the split shape mode information indicating to perform splitting in a horizontal direction. The image decoding apparatus 100 may determine four coding units 310*d* obtained by splitting the current coding unit 300 in vertical and horizontal directions, based on the split shape mode information indicating to perform splitting in vertical and horizontal directions. According to an embodiment, the image decoding apparatus 100 may determine three coding units 310*e* obtained by splitting the current coding unit 300 in a vertical direction, based on the split shape mode information indicating to perform ternary-splitting in a vertical direction. The image decoding apparatus 100 may determine three coding units 310*f* obtained by splitting the current coding unit 300 in a horizontal direction, based on the split shape mode information indicating to perform ternary-splitting in a horizontal direction. However, splitting methods of the coding unit having a square shape are not limited to the above-described methods, and the split shape mode information may indicate various methods. Certain splitting methods of splitting the square coding unit will be described in detail below in relation to various embodiments.

FIG. 4 illustrates a process, performed by an image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating no split, or determine coding units 420*a* and 420*b*, 430*a* to 430*c*, 470*a* and 470*b*, or 480*a* to 480*c* split based on the split shape mode information indicating a certain splitting method. Certain splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment, a height to width ratio of the current coding unit 400 or 450 may be 4:1 or 1:4. When the height to width ratio is 1:4, the block shape information may be a horizontal direction because the length of the width is longer than the length of the height. When the height to width ratio is 4:1, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a to 430c by splitting the current coding unit 400 in the horizontal direction. Also, when the current coding unit 450 is in the horizontal direction, the image decoding apparatus 100 may determine the coding units 480a to 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a certain coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c or 480a, 480b, and 480c generated as the current coding unit 400 or 450 is split to be different from that of the other coding units 430a and 430c, or 480a or 480c. For example, the image decoding apparatus 100 may restrict the coding unit 430b or 480b at the center location to be no longer split or to be split only a certain number of times, unlike the other coding units 430a and 430c, or 480a and 480c.

Figure 5:
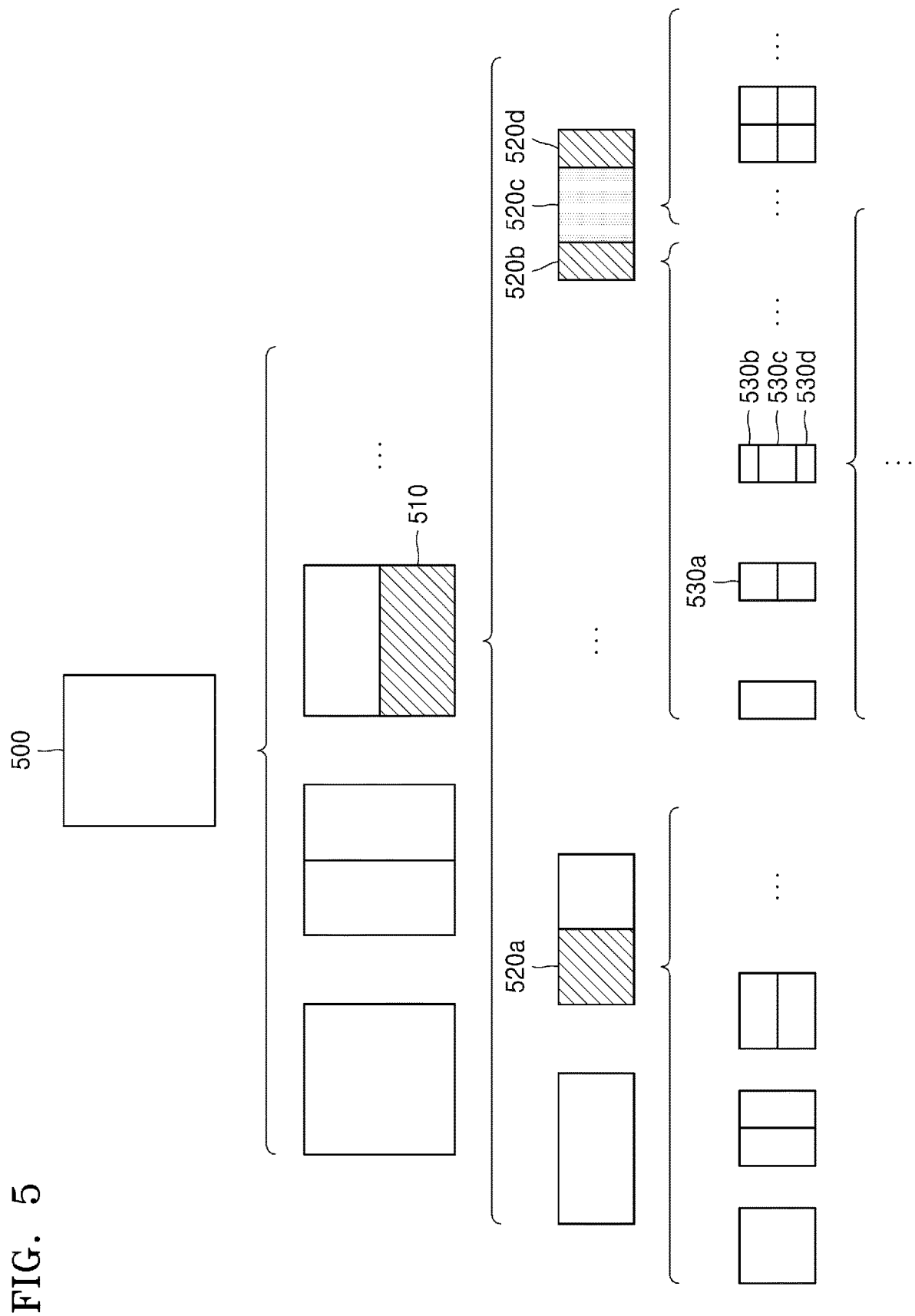
FIG. 5 illustrates a process, performed by an image decoding apparatus, of splitting a coding unit based on at least one of block shape information and split shape mode information, according to an embodiment.

FIG. 5 illustrates a process, performed by an image decoding apparatus, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information or the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520a, or 520b, 520c, and 520d based on the split shape mode information. The image decoding apparatus 100 may obtain the split shape mode information, and may obtain a plurality of variously shaped second coding units (e.g., the second coding unit 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a certain coding unit from among the odd number of third coding units 520b, 520c, and 520d determined by splitting the non-square second coding unit 510 (e.g., a coding unit at a center location or a square coding unit) may be recursively split. According to an embodiment, the square third coding unit 520b from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be split into a plurality of coding units again. For example, the non-square fourth coding unit 530b or 530d may be split into the odd number of coding units again. A method that may be used to recursively split a coding unit will be described below in relation to various embodiments.

According to an embodiment, the image decoding apparatus 100 may split each of the third coding units 520a, 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a certain restriction on a certain third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a certain location in the current coding unit.

Figure 6:
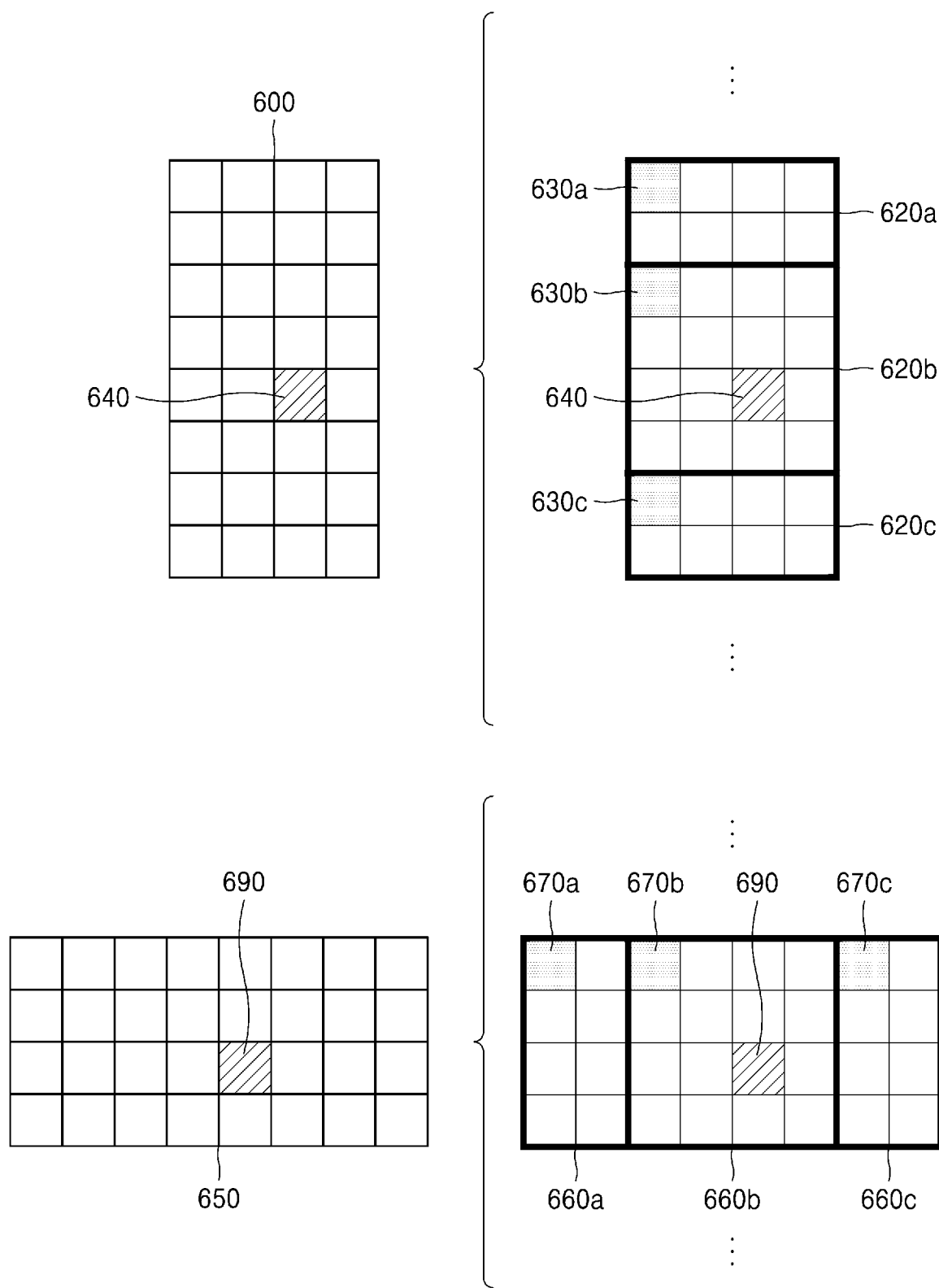
FIG. 6 illustrates a method, performed by an image decoding apparatus, of determining a certain coding unit from among an odd number of coding units, according to an embodiment.

FIG. 6 illustrates a method, performed by an image decoding apparatus, of determining a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the certain location and may determine to split or not to split the current coding unit into coding units having various shapes and sizes.

According to an embodiment, when the current coding unit is split into a certain number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a certain location.

According to an embodiment, the image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of certain samples included in the coding units 620a, 620b, and 620c. In detail, the image decoding apparatus 100 may determine the coding unit 620b at the center location by determining the locations of the coding units 620a, 620b, and 620c based on information indicating locations of upper left samples 630a, 630b, and 630c of the coding units 620a, 620b, and 620c.

According to an embodiment, the information indicating the locations of the upper left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to values of the differences between the coordinates.

According to an embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at the center location may be determined as a coding unit at the center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with reference to the location of the upper left sample 630a of the upper coding unit 620a. A method of determining a coding unit at a certain location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into the plurality of coding units 620a, 620b, and 620c, and may select one of the coding units 620a, 620b, and 620c based on a certain criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that is the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

The image decoding apparatus 100 may determine the width or height of each of the coding units 660a, 660b, and 660c by using the coordinates (xd, yd) that is information indicating the location of a upper left sample 670a of the left coding unit 660a, the coordinates (xe, ye) that is information indicating the location of a upper left sample 670b of the middle coding unit 660b, and the coordinates (xf, yf) that is information indicating a location of the upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 600. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a certain location from among an odd number of coding units determined by splitting the current coding unit, considering the shape of the current coding unit. For example, when the current coding unit has a non-square shape with a height and a width longer than the height, the image decoding apparatus 100 may determine the coding unit at the certain location in a horizontal direction. That is, the image decoding apparatus 100 may determine one of coding units at different locations in a horizontal direction and put a restriction on the coding unit. When the current coding unit has a non-square shape with a width and a height longer than the width, the image decoding apparatus 100 may determine the coding unit at the certain location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary-splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information or split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at the center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment, the image decoding apparatus 100 may determine the sample 640 at the center location of the current coding unit 600 as the sample from which the certain information may be obtained, and may put a certain restriction on the coding unit 620b including the sample 640, in a decoding operation. However, the location of the sample from which the certain information may be obtained is not limited to the above-described location, and may include arbitrary locations of samples included in the coding unit 620b to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located on a boundary for splitting at least one of a width or height of the current coding unit in half, as the sample from which the certain information may be obtained, by using at least one of information about the width of the current coding unit or information about the height of the current coding unit. As another example, when the block shape information of the current coding unit indicates a non-square shape, the image decoding apparatus 100 may determine one of samples including a boundary for splitting a long side of the current coding unit in half, as the sample from which the predetermined information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a certain block (e.g., the current coding unit).

Figure 7:
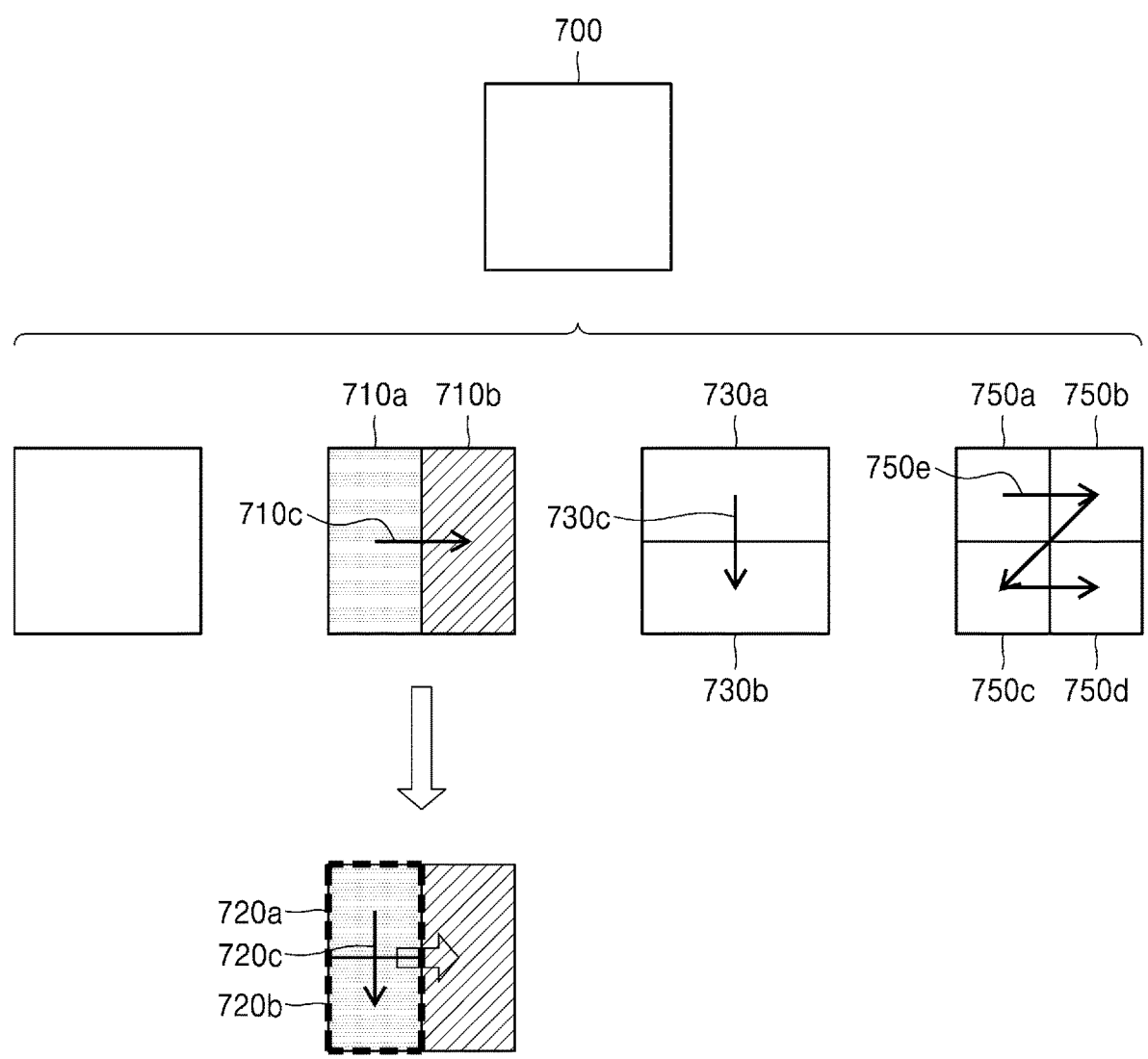
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a certain order for processing coding units in a row and then processing coding units in a next row (e.g., in a raster scan order or Z-scan order 750e).

According to an embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710a and 710b, 730a and 730b, or 750a to 750d. A splitting method of the plurality of coding units 710a and 710b, 730a and 730b, or 750a to 750d may correspond to a splitting method of the first coding unit 700. As such, each of the plurality of coding units 710a and 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a certain order.

Figure 8:
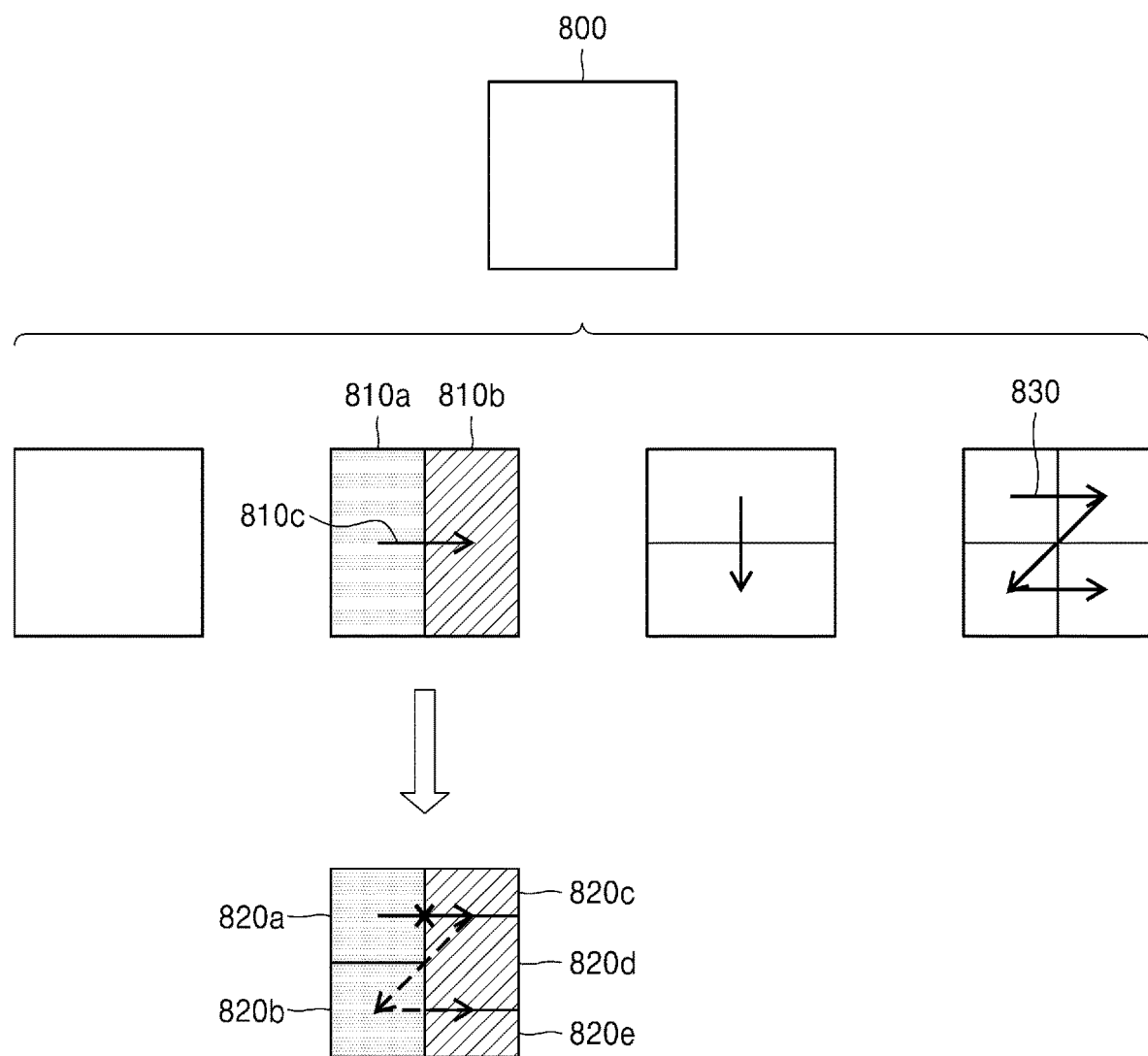
FIG. 8 illustrates a process, performed by an image decoding apparatus, of determining that a current coding unit is to be split into an odd number of coding units, when the coding units are not processable in a certain order, according to an embodiment.

FIG. 8 illustrates a process, performed by an image decoding apparatus, of determining that a current coding unit is to be split into an odd number of coding units, when the coding units are not processable in a predetermined order, according to an embodiment.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a certain order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c to 820e are split into an odd number of coding units, based on at least one of the block shape information or the split shape mode information. For example, the right second coding unit 810b among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the certain order.

According to an embodiment, the image decoding apparatus 100 may determine whether the third coding units 820a and 820b, and 820c to 820e included in the first coding unit 800 satisfy the condition for processing in the certain order, and the condition relates to whether at least one of a width or height of the second coding units 810a and 810b is split in half along a boundary of the third coding units 820a and 820b, and 820c to 820e. For example, the third coding units 820a and 820b determined by splitting the height of the left second coding unit 810a of the non-square shape in half may satisfy the condition. It may be determined that the third coding units 820c to 820e do not satisfy the condition because the boundaries of the third coding units 820c to 820e determined by splitting the right second coding unit 810b into three coding units are unable to split the width or height of the right second coding unit 810b in half. When the condition is not satisfied as described above, the image decoding apparatus 100 may determine disconnection of a scan order, and may determine that the right second coding unit 810b is split into an odd number of coding units, based on a result of the determination. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof are not provided again.

Figure 9:
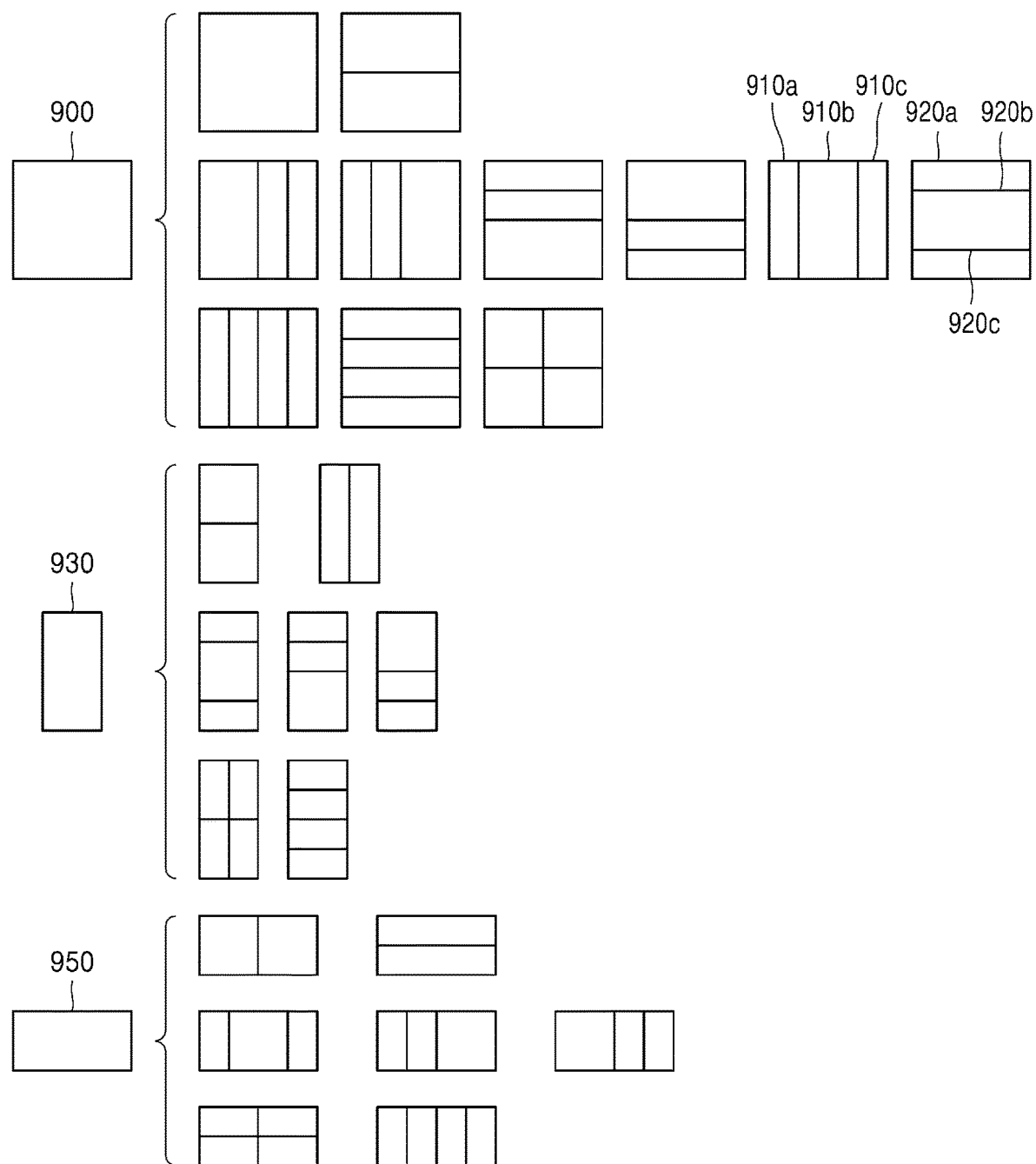
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment.

According to an embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the first coding unit 900 is a square coding unit and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width or height of the first coding unit 900 is split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the certain order. In addition, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof are not provided again.

According to an embodiment, the image decoding apparatus 100 may determine variously shaped coding units by splitting a first coding unit.

Referring to FIG. 9, the image decoding apparatus 100 may split the square first coding unit 900 or a non-square first coding unit 930 or 950 into variously shaped coding units.

Figure 10:
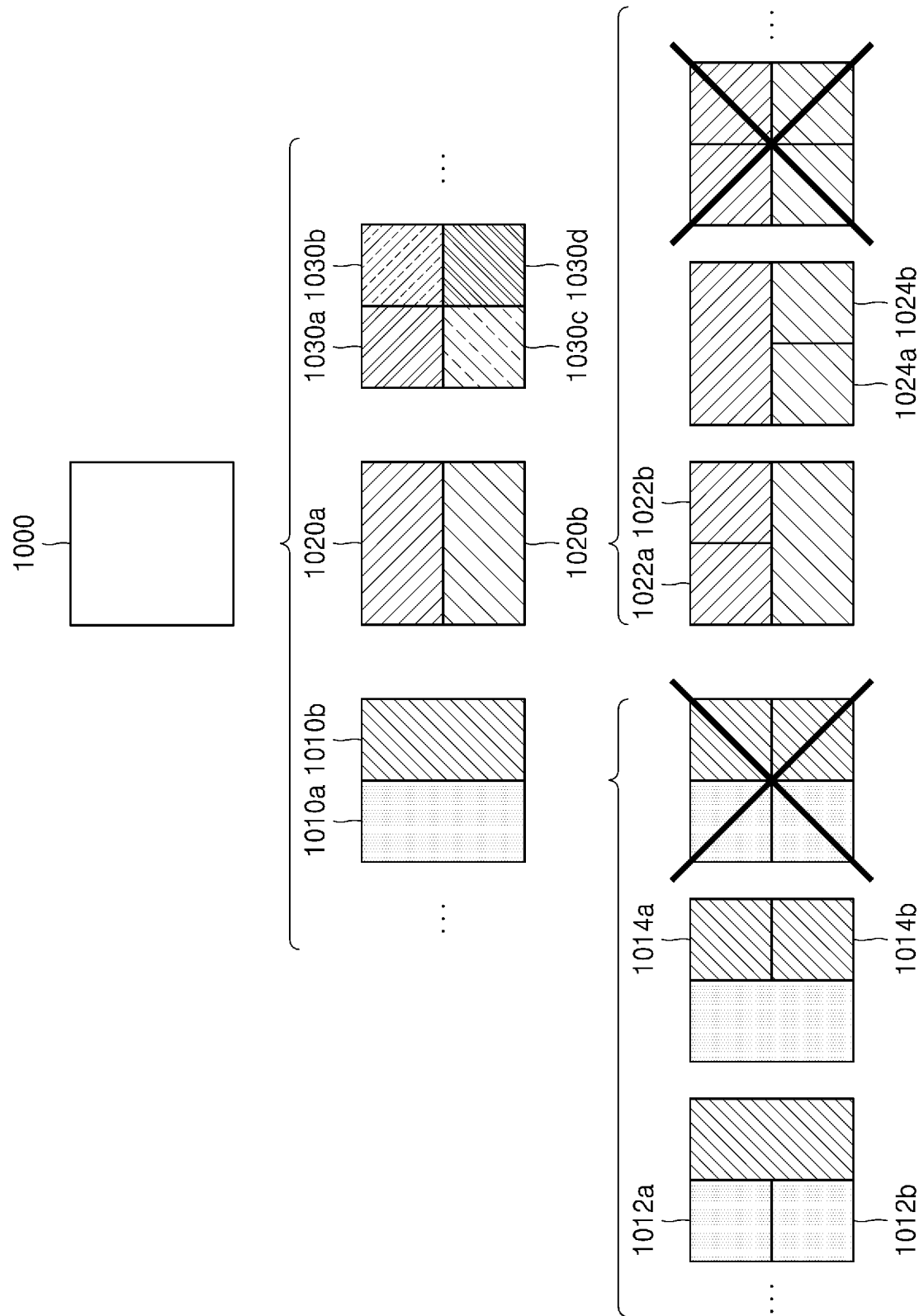
FIG. 10 illustrates that a shape into which a second coding unit is splittable is restricted when the second coding unit having a non-square shape, which is determined when an image decoding apparatus splits a first coding unit, satisfies a certain condition, according to an embodiment.

FIG. 10 illustrates that a shape into which a second coding unit is splittable is restricted when the second coding unit having a non-square shape, which is determined when an image decoding apparatus splits a first coding unit, satisfies a certain condition, according to an embodiment.

According to an embodiment, the image decoding apparatus 100 may determine to split the square first coding unit 1000 into non-square second coding units 1010*a*, and 1010*b* or 1020*a* and 1020*b*, based on split shape mode information, which is obtained by the receiver 110. The second coding units 1010*a* and 1010*b* or 1020*a* and 1020*b* may be independently split. As such, the image decoding apparatus 100 may determine to split or not to split each of the second coding units 1010*a* and 1010*b* or 1020*a* and 1020*b* into a plurality of coding units, based on the split shape mode information of each of the second coding units 1010*a* and 1010*b* or 1020*a* and 1020*b*. According to an embodiment, the image decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding apparatus 100 may restrict the right second coding unit 1010*b* not to be split in a horizontal direction in which the left second coding unit 1010*a* is split. When third coding units 1014*a* and 1014*b* are determined by splitting the right second coding unit 1010*b* in a same direction, because the left and right second coding units 1010*a* and 1010*b* are independently split in a horizontal direction, the third coding units 1012*a* and 1012*b* or 1014*a* and 1014*b* may be determined. However, this case serves equally as a case in which the image decoding apparatus 100 splits the first coding unit 1000 into four square second coding units 1030*a*, 1030*b*, 1030*c*, and 1030*d*, based on the split shape mode information, and may be inefficient in terms of image decoding.

According to an embodiment, the image decoding apparatus 100 may determine third coding units 1022*a* and 1022*b* or 1024*a* and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the image decoding apparatus 100 may restrict the other second coding unit (e.g., the lower second coding unit 1020*b*) not to be split in a vertical direction in which the upper second coding unit 1020*a* is split.

Figure 11:
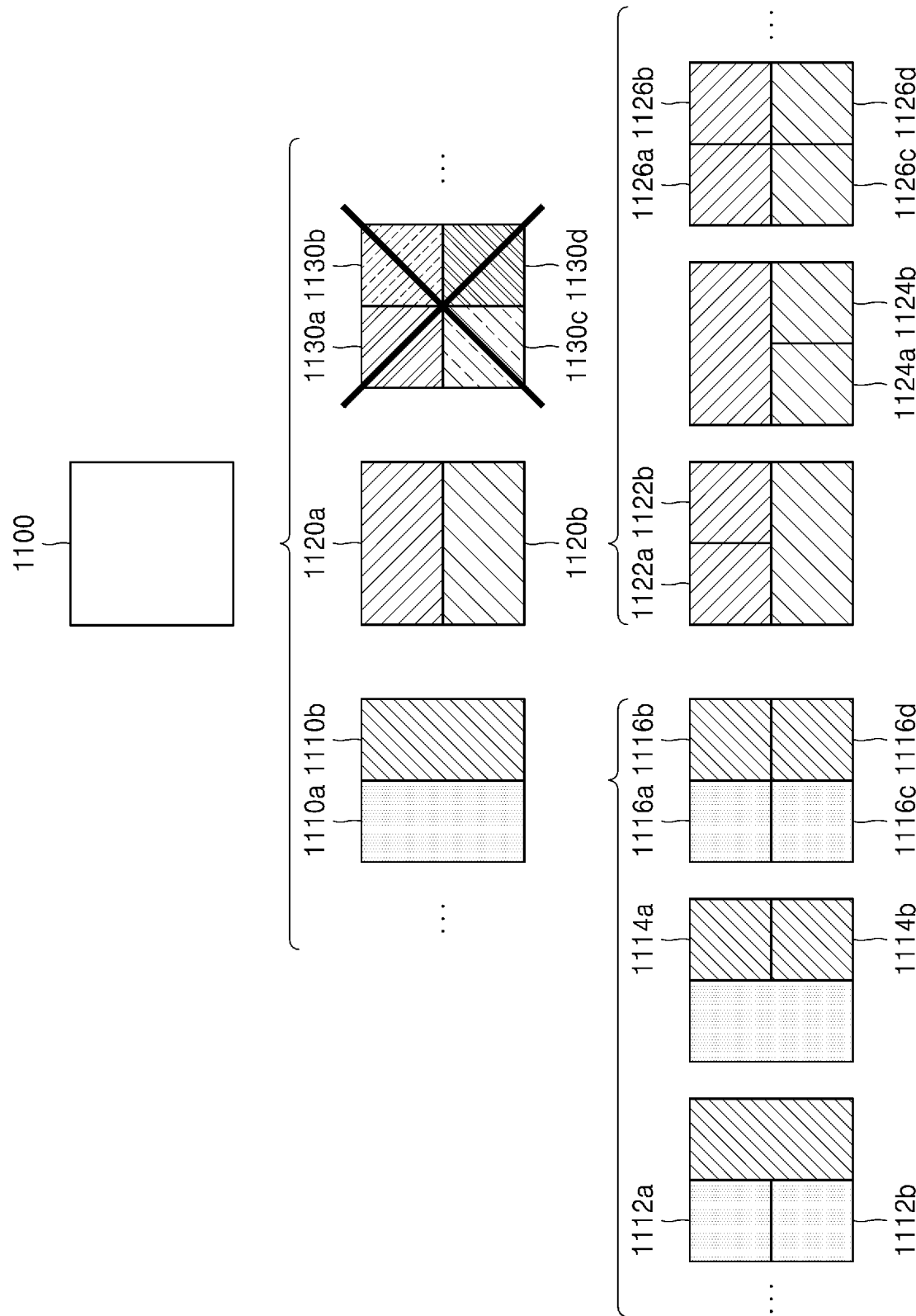
FIG. 11 illustrates a process, performed by an image decoding apparatus, of splitting a square coding unit when split shape mode information is unable to indicate that the square coding unit is split into four square coding units, according to an embodiment.

FIG. 11 illustrates a process, performed by an image decoding apparatus, of splitting a square coding unit when split shape mode information is unable to indicate that the square coding unit is split into four square coding units, according to an embodiment.

According to an embodiment, the image decoding apparatus 100 may determine second coding units 1110*a* and 1110*b* or 1120*a* and 1120*b*, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130*a*, 1130*b*, 1130*c*, and 1130*d*. The image decoding apparatus 100 may determine the non-square second coding units 1110*a* and 1110*b* or 1120*a* and 1120*b*, etc., based on the split shape mode information.

According to an embodiment, the image decoding apparatus 100 may independently split the non-square second coding units 1110*a* and 1110*b* or 1120*a* and 1120*b*, etc. Each of the second coding units 1110*a* and 1110*b* or 1120*a* and 1120*b*, etc. may be recursively split in a certain order, and this splitting method may correspond to a method of splitting the first coding unit 1100, based on the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both of the left and right second coding units 1110*a* and 1110*b* in a horizontal direction. In this case, coding units having the same shape as the four square second coding units 1130*a*, 1130*b*, 1130*c*, and 1130*d* split from the first coding unit 1100 may be determined.

As another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units 1126*a*, 1126*b*, 1126*c*, and 1126*d* by splitting both of the upper and lower second coding units 1120*a* and 1120*b* in a vertical direction. In this case, coding units having the same shape as the four square second coding units 1130*a*, 1130*b*, 1130*c*, and 1130*d* split from the first coding unit 1100 may be determined.

Figure 12:
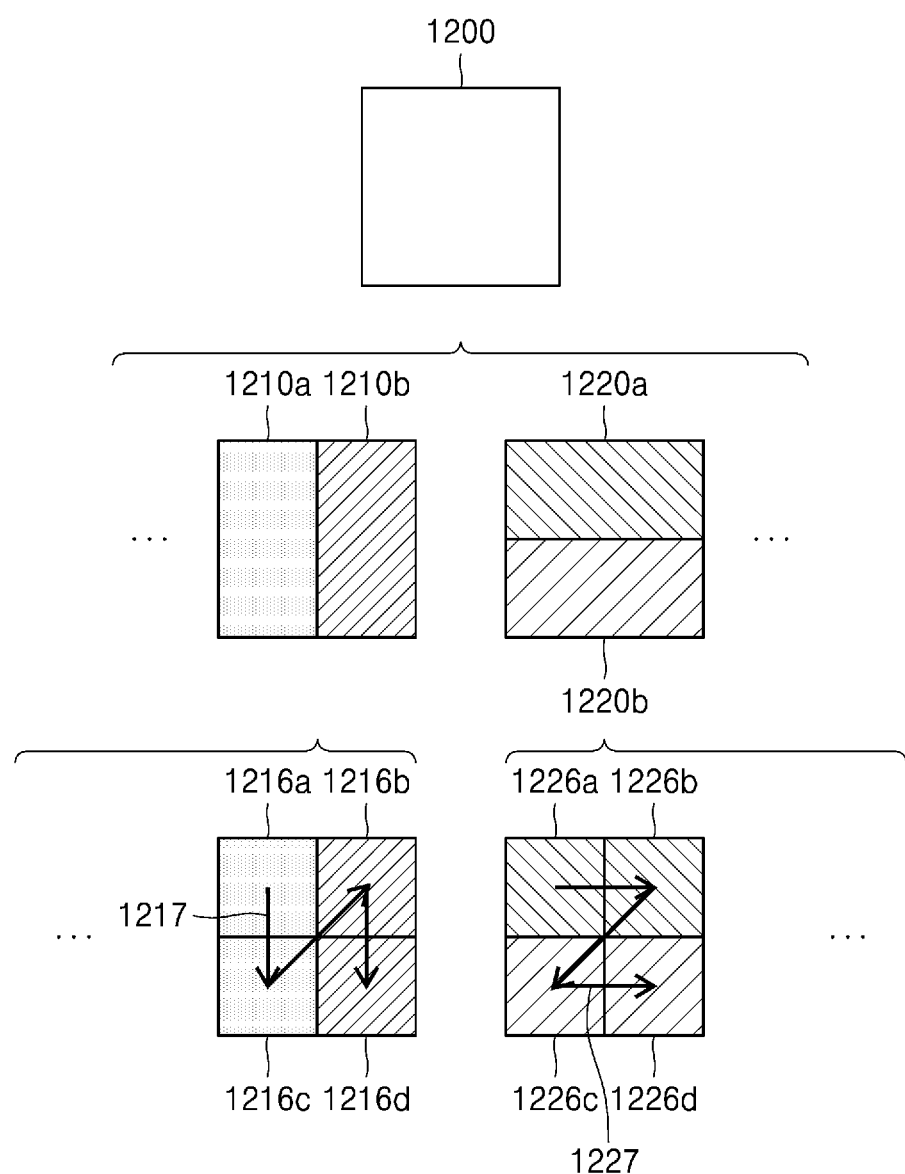
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape is a square shape and the split shape mode information indicates to split the first coding unit 1200 in at least one of a horizontal direction or a vertical direction, the image decoding apparatus 100 may determine second coding units 1210*a* and 1210*b* or 1220*a* and 1220*b*, etc. by splitting the first coding unit 1200. Referring to FIG. 12, the non-square second coding units 1210*a* and 1210*b* or 1220*a* and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a horizontal direction. An operation of splitting the second coding units 1210*a* and 1210*b* or 1220*a* and 1220*b* has been described above in relation to FIG. 11, and thus detailed descriptions thereof will not be provided herein.

According to an embodiment, the image decoding apparatus 100 may process coding units in a certain order. An operation of processing coding units in a predetermined order has been described above in relation to FIG. 7, and thus detailed descriptions thereof will not be provided herein. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a splitting method of the first coding unit 1200.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (for example, the block shape information may be expressed as '1: NS_VER' indicating a non-square shape with a width and a height longer than the width, or as '2: NS_HOR' indicating a non-square shape with a height and a width longer than the height).

The image decoding apparatus 100 may determine a second coding unit 1302, 1312, or 1322 by splitting at least one of a width or height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width or height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width or height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width or height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width or height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
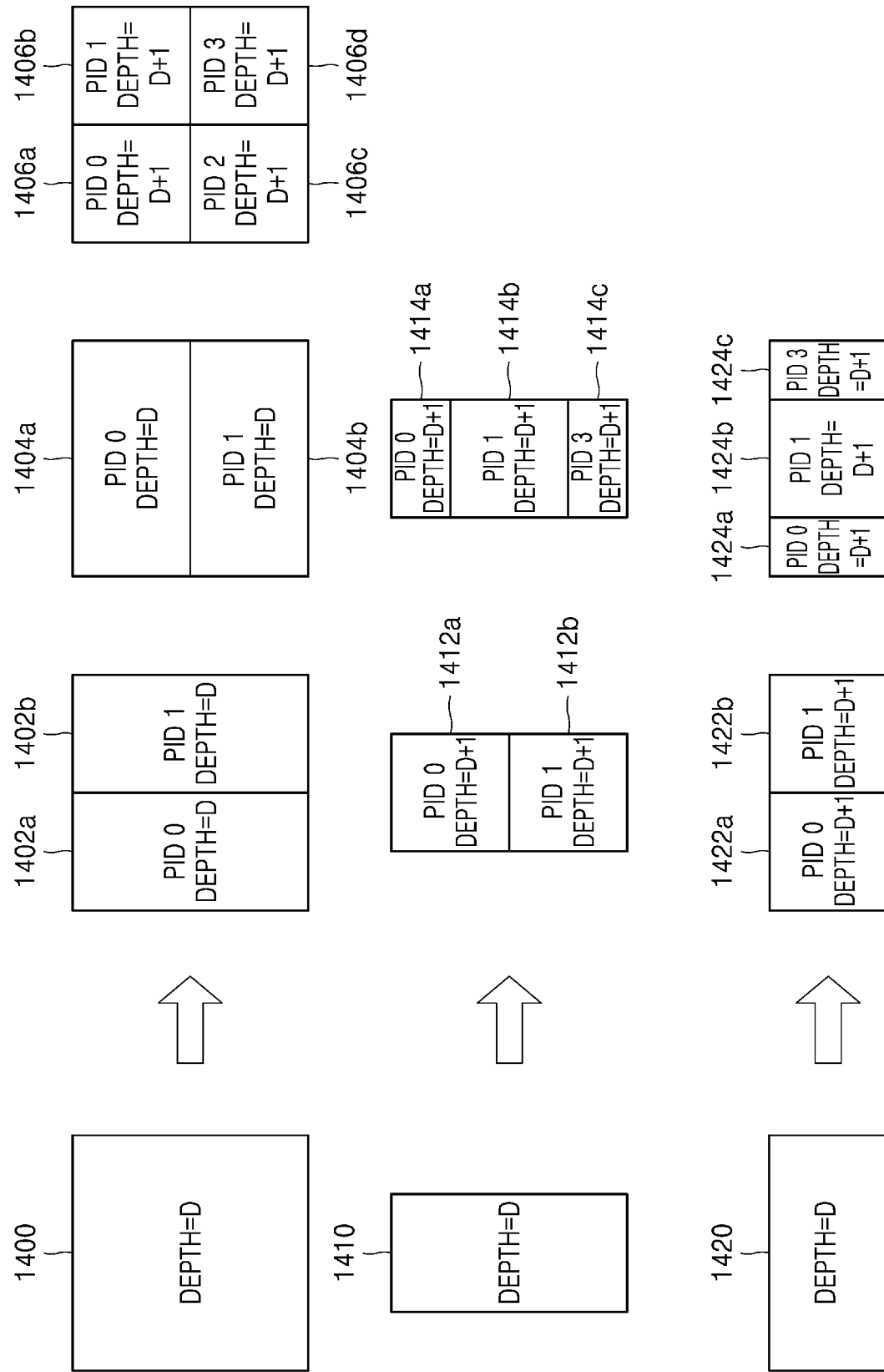
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine variously shaped second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of a vertical direction and a horizontal direction based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is lower than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410 having a width and a height longer than the width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420 having a height and a width longer than the height, in a vertical direction based on the split shape mode information.

According to an embodiment, depths of the second coding units 1412a and 1412b, and 1414a, 1414b, and 1414c, or 1422a and 1422b, and 1424a, 1424b, and 1424c that are determined based on the split shape mode information of the non-square first coding unit 1410 or 1420 may be determined based on the length of a long side thereof. For example, because the length of a side of the square second coding units 1412a and 1412b is ½ times the length of a long side of the first coding unit 1410 having a non-square shape with a width and a height longer than the width, a depth of the square second coding units 1412a and 1412b is D+1 which is lower than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is lower than the depth D of the non-square first coding unit 1410 by 1. The image decoding apparatus 100 may determine depths of coding units split from the first coding unit 1420 having a non-square shape with a height and a width longer than the height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape with a width and a height longer than the width. The image decoding apparatus 100 may use PIDs indicating respective coding units so as to identify the respective coding units. According to an embodiment, the PID may be obtained from a sample of a certain location of each coding unit (e.g., an upper left sample).

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape with a width and a height longer than the width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location are not limited to the above-described examples, and various PIDs and various locations and sizes of coding units may be used.

According to an embodiment, the image decoding apparatus 100 may use a certain data unit where a coding unit starts to be recursively split.

Figure 15:
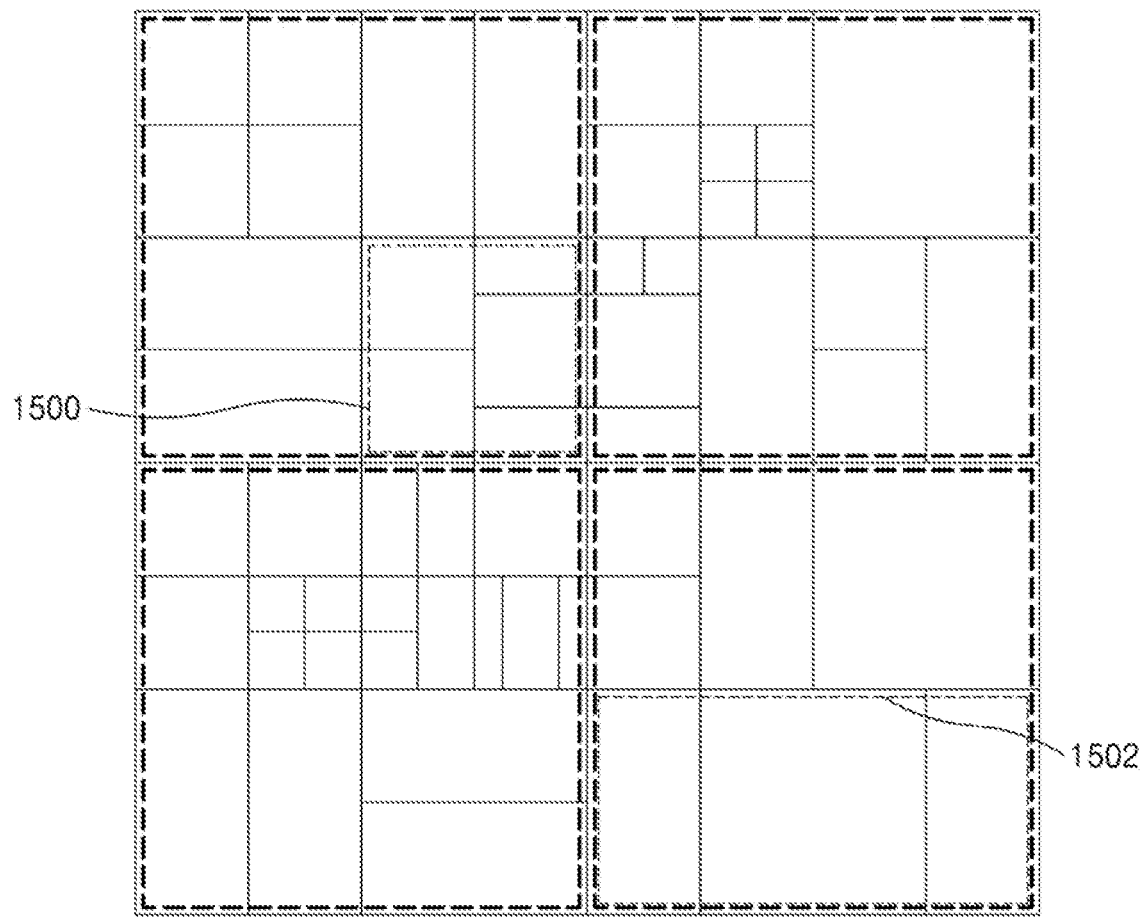
FIG. 15 illustrates that a plurality of coding units are determined based on a plurality of certain data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data units may correspond to a splitting operation using a quadtree structure.

According to an embodiment, the image decoding apparatus 100 may previously determine the smallest size allowed for the reference data units included in the current picture. Accordingly, the image decoding apparatus 100 may determine various reference data units having sizes equal to or greater than the smallest size, and may determine one or more coding units by using the split shape mode information with reference to the determined reference data units.

Referring to FIG. 15, the image decoding apparatus 100 may use a square reference coding unit 1500 or a non-square reference coding unit 1502. According to an embodiment, the shapes and sizes of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof are not provided again.

According to an embodiment, the image decoding apparatus 100 may use a PID for identifying the size and shape of reference coding units, to determine the size and shape of reference coding units according to some data units previously determined based on a certain condition. That is, the receiver 110 may obtain, from the bitstream, only the PID for identifying the size and shape of reference coding units with respect to each slice, slice segment, tile, tile group, or largest coding unit as a data unit satisfying a predetermined condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the certain condition, by using the PID. When the reference coding unit shape information and the reference coding unit size information are obtained from the bitstream according to each data unit having a relatively small size and used, efficiency of using the bitstream may not be high, and therefore, only the PID may be obtained and used instead of directly obtaining the reference coding unit shape information and the reference coding unit size information. In this case, at least one of the size or shape of reference coding units corresponding to the PID for identifying the size and shape of reference coding units may be previously determined. That is, the image decoding apparatus 100 may determine at least one of the size or shape of reference coding units included in a data unit serving as a unit for obtaining the PID, by selecting the previously determined at least one of the size or shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the present disclosure will be described in detail.

The image decoding apparatus 100 may determine a split rule of an image. The split rule may be pre-determined between the image decoding apparatus 100 and the image encoding apparatus 1700. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, a shape, a height to width ratio, and a direction of the coding unit. The image decoding apparatus 100 may pre-determine to determine the split rule based on block shape information of a coding unit. However, the present disclosure is not limited thereto. The image decoding apparatus 100 may determine the split rule of the image, based on information obtained from a received bitstream.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side of the coding unit, or the area of the coding unit. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The height to width ratio of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof.

The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined in the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, the present disclosure is not limited thereto, and the coding units generated via different splitting paths may have the same block shape. The coding units generated via the different splitting paths may have different decoding processing orders. Because the decoding processing orders have been described above with reference to FIG. 12, details thereof are not provided again.

Figure 16:
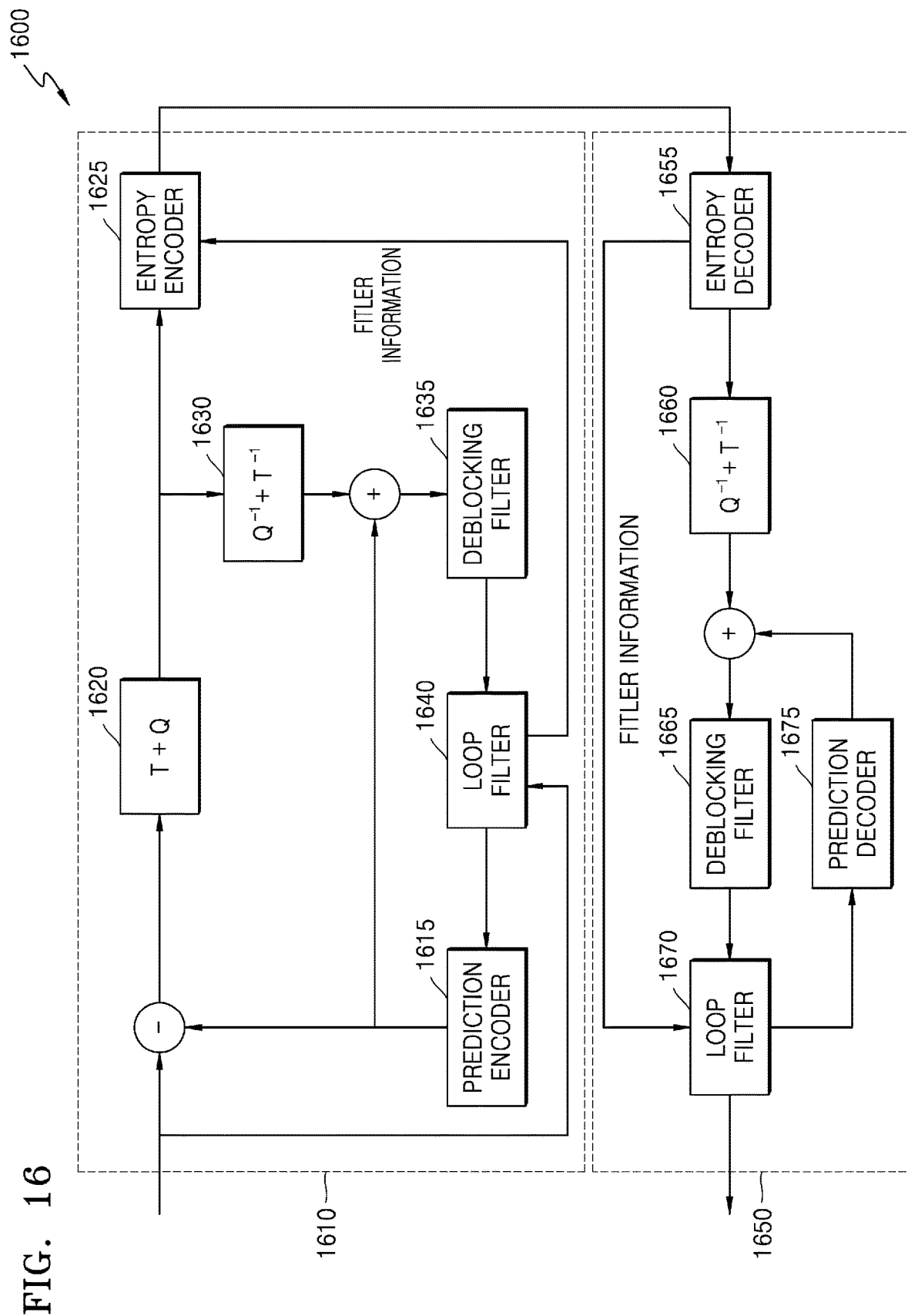
FIG. 16 is a block diagram of an image encoding and decoding system according to an embodiment.

FIG. 16 is a block diagram of an image encoding and decoding system.

An encoding end 1610 of an image encoding and decoding system 1600 transmits an encoded bitstream of an image and a decoding end 1650 outputs a reconstructed image by receiving and decoding the bitstream. Here, the decoding end 1650 may have a similar configuration as the image decoding apparatus 100.

At the encoding end 1610, a prediction encoder 1615 outputs a reference image via inter-prediction and intra-prediction, and a transformer and quantizer 1620 quantizes residual data between the reference picture and a current input image to a quantized transform coefficient and outputs the quantized transform coefficient. An entropy encoder 1625 transforms the quantized transform coefficient by encoding the quantized transform coefficient, and outputs the transformed quantized transform coefficient as a bitstream. The quantized transform coefficient is reconstructed as data of a spatial domain via an inverse quantizer and inverse transformer 1630, and the data of the spatial domain is output as a reconstructed image via a deblocking filter 1635 and a loop filter 1640. The reconstructed image may be used as a reference image of a next input image via the prediction encoder 1615.

Encoded image data among the bitstream received by the decoding end 1650 is reconstructed as residual data of a spatial domain via an entropy decoder 1655 and an inverse quantizer and inverse transformer 1660. Image data of a spatial domain is configured when the residual data and a reference image output from a prediction decoder 1675 are combined, and a deblocking filter 1665 and a loop filter 1670 may output a reconstructed image regarding a current original image by performing filtering on the image data of the spatial domain. The reconstructed image may be used by the prediction decoder 1675 as a reference image for a next original image.

The loop filter 1640 of the encoding end 1610 performs loop filtering by using filter information input according to a user input or system setting. The filter information used by the loop filter 1640 is output to the entropy encoder 1625 and transmitted to the decoding end 1650 together with the encoded image data. The loop filter 1670 of the decoding end 1650 may perform loop filtering based on the filter information input from the decoding end 1650.

Hereinafter, a method and apparatus for encoding or decoding a video by using blocks of various sizes and various shapes split from a picture, according to an embodiment of the present specification, will be described with reference to FIGS. 17 through 20.

Figure 17:
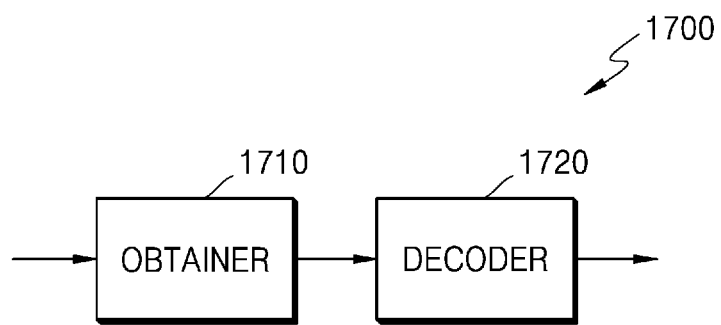
FIG. 17 is a block diagram of a video decoding apparatus according to an embodiment.

FIG. 17 is a block diagram of a video decoding apparatus according to an embodiment.

Referring to FIG. 17, a video decoding apparatus 1700 according to an embodiment may include an obtainer 1710 and a decoder 1720.

The video decoding apparatus 1700 may obtain a bitstream generated as a result of encoding an image, determine locations of blocks split from a picture, based on information included in the bitstream, and decode the blocks, such as a largest coding unit and a coding unit.

The video decoding apparatus 1700 according to an embodiment may include a central processor (not shown) for controlling the obtainer 1710 and the decoder 1720. Alternatively, the obtainer 1710 and the decoder 1720 may operate respectively by their own processors (not shown), and the processors may operate systematically such that the video decoding apparatus 1700 operates as a whole. Alternatively, the obtainer 1710 and the decoder 1720 may be controlled under control of an external processor (not shown) of the video decoding apparatus 1700.

The video decoding apparatus 1700 may include at least one data storage (not shown) storing input and output data of the obtainer 1710 and the decoder 1720. The video decoding apparatus 1700 may include a memory controller (not shown) for controlling data input and output of the data storage.

The video decoding apparatus 1700 may perform an image decoding operation including prediction by connectively operating with an internal video decoding processor or an external video decoding processor so as to reconstruct an image via image decoding. The internal video decoding processor of the video decoding apparatus 1700 according to an embodiment may perform a basic image decoding operation when not only a separate processor but also a central processing apparatus or a graphic processing apparatus include an image decoding processing module.

The video decoding apparatus 1700 may be included in the image decoding apparatus 100 described above. For example, the obtainer 1710 may be included in the receiver 110 of the image decoding apparatus 100 of FIG. 1, and the decoder 1720 may be included in the decoder 120 of the image decoding apparatus 100.

The obtainer 1710 receives the bitstream generated as the result of encoding the image. The bitstream may include information about a current slice. The current slice is one of one or more slices included in the picture, and may include one or more tiles. The tile may include one or more largest coding units. The decoder 1720 may determine a location of a current block in the picture, based on the information obtained by the obtainer 1710. The current block is a block generated when the image is split according to a tree structure, and for example, may correspond to a largest coding unit, a coding unit, or a transform unit. The decoder 1720 may decode the one or more tiles included in the current slice, according to an encoding order. In this regard, the decoder 1720 may decode one or more blocks included in a current tile.

A size of each block may be represented by "height× width" of a rectangle. Also, a shape of the block may be represented by a height to width ratio of a block, i.e., "height:width". The decoder 1720 may determine blocks of various shapes and various sizes, based on a syntax element, and decode samples included in each block of the blocks.

The obtainer 1710 according to an embodiment may determine the current block based on block shape information and/or information about a split shape mode, which are included in at least one of a sequence parameter set, a picture parameter set, a video parameter set, a slice header, and a slice segment header. Furthermore, the decoder 1720 may obtain, from the bitstream, a syntax element corresponding to the block shape information or the information about the split shape mode according to each largest coding unit, each reference coding unit, or each processing block, and may use the obtained syntax element to determine the current block.

The obtainer 1710 according to an embodiment may obtain, from the bitstream, information about a largest size of a block allowed to be ternary split, and information about a smallest size of the block allowed to be ternary split.

The obtainer 1710 according to an embodiment may obtain, from the bitstream, information about a largest size of a coding unit supportable by the video decoding apparatus 1700, and information about a smallest size of the coding unit.

The decoder 1720 according to an embodiment may determine the largest size of the coding unit, by using the information about the largest size of the coding unit obtained from the bitstream. The decoder 1720 according to an embodiment may determine the smallest size of the coding unit, by using the information about the smallest size of the coding unit obtained from the bitstream.

The decoder 1720 may determine the largest size of the block allowed to be ternary split, by using the largest size of the coding unit and the information about the largest size of the block allowed to be ternary split. Also, the decoder 1720 may determine the smallest size of the block allowed to be ternary split, by using the smallest size of the coding unit and the information about the smallest size of the block allowed to be ternary split.

The decoder 1720 may determine whether to ternary split a current block, based on the largest size of the block allowed to be ternary split and the smallest size of the block allowed to be ternary split. When the current block is ternary split accordingly, the decoder 1720 may decode blocks generated by ternary splitting the current block. In detail, the decoder 1720 may determine prediction blocks by performing prediction on the blocks generated via a ternary split. When a prediction mode of the blocks generated via the ternary split is not a skip mode, residual blocks may be generated by performing inverse quantization and inverse transform on the blocks generated via the ternary split. The decoder 1720 may determine reconstructed blocks of the blocks generated via the ternary split by combining the prediction blocks and the residual blocks.

For example, when the prediction mode of the current block is an intra mode, the decoder 1720 may determine a reference sample among samples of a spatial neighboring block located in an intra prediction direction, by using intra prediction information of the current block, and determine prediction samples corresponding to the current block, by using the reference sample.

For example, when the prediction mode of the current block is an inter mode, the decoder 1720 may reconstruct the current block by using a motion vector of the current block. The decoder 1720 may determine a reference block in a reference picture by using the motion vector of the current block, and determine the prediction samples corresponding to the current block from reference samples included in the reference block.

When the prediction mode of the current block is not the skip mode, the video decoding apparatus 1700 may parse transform coefficients of the current block from the bitstream and obtain residual samples by performing inverse quantization and inverse transform on the transform coefficients. The decoder 1720 may determine reconstructed samples of the current block by combining the prediction samples of the current block and the residual samples of the current block.

The decoder 1720 according to an embodiment may reconstruct a tile including one or more largest coding units by reconstructing blocks included in a largest coding unit. Also, the decoder 1720 may reconstruct a slice including one or more tiles and reconstruct a picture including one or more slices.

Hereinafter, a video decoding method, performed by the video decoding apparatus 1700, for decoding blocks of various sizes and various shapes split from a picture, according to an embodiment, will be described with reference to FIG. 18.

Figure 18:
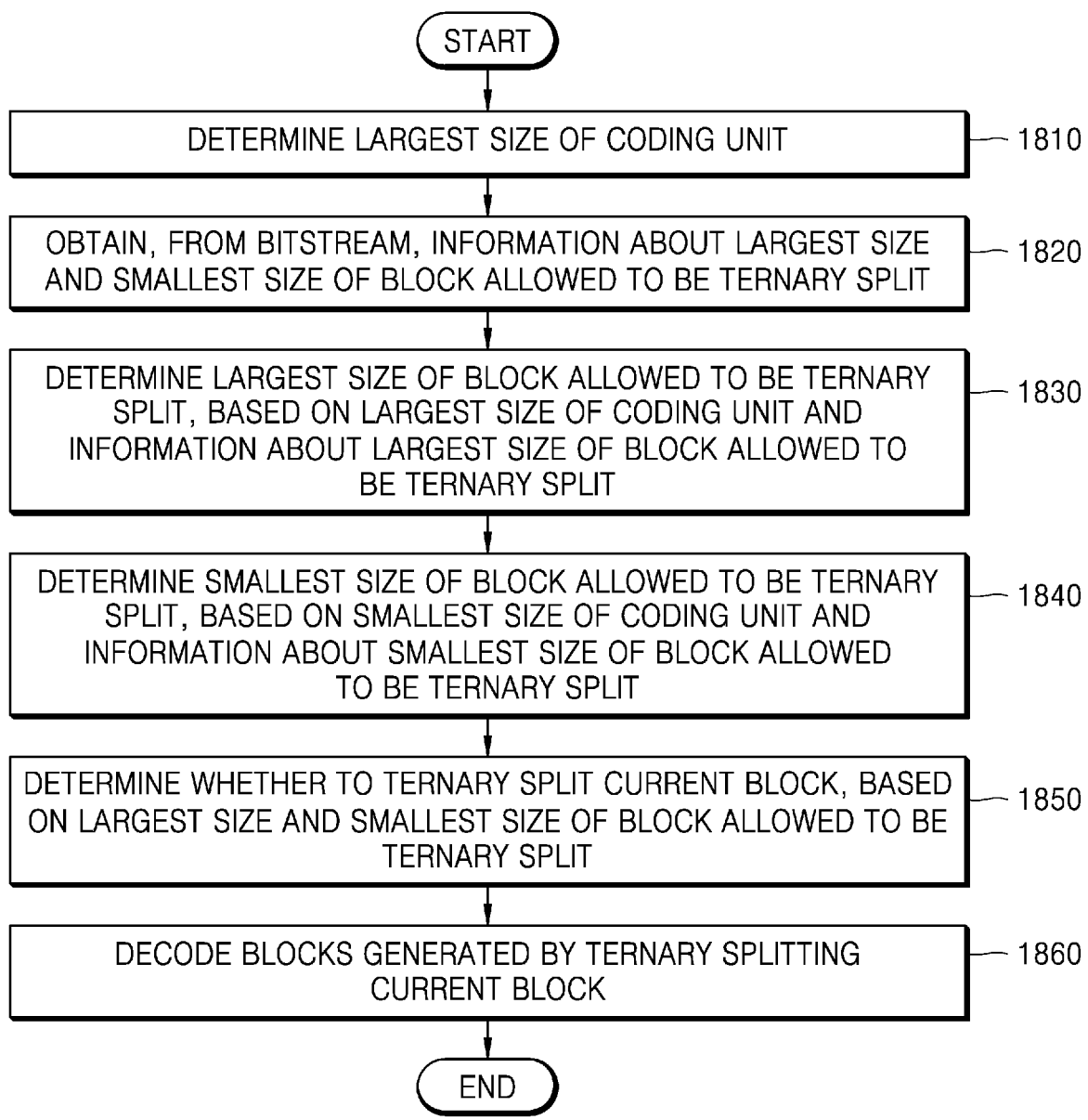
FIG. 18 is a flowchart of a video decoding method according to an embodiment.

FIG. 18 is a flowchart of a video decoding method according to an embodiment.

In operation 1810, the decoder 1720 according to an embodiment may determine a largest size of a coding unit, by using information about the largest size of the coding unit obtained from a bitstream. For example, the obtainer 1710 may obtain, from a sequence parameter set, the information about the largest size of the coding unit.

In operation 1820, the obtainer 1710 according to an embodiment may obtain, from the bitstream, information about a largest size of a block allowed to be ternary split, and information about a smallest size of the block allowed to be ternary split. The information about the largest size of the block allowed to be ternary split, obtained according to an embodiment, may indicate a value of a difference between the largest size of the coding unit and the largest size of the block allowed to be ternary split.

The information about the smallest size of the block allowed to be ternary split, obtained according to an embodiment, may indicate a value of a difference between a smallest size of the coding unit and the smallest size of the block allowed to be ternary split. The smallest size of the coding unit may be pre-set. In detail, the information about the smallest size of the block allowed to be ternary split may indicate a value obtained by subtracting 2 from the value of the difference between the smallest size of the coding unit and the smallest size of the block allowed to be ternary split. For example, because a size of a smallest block is 4×4, a size of a smallest block to which a ternary split is applicable may be 16×4. Accordingly, the information about the smallest size of the block allowed to be ternary split may be defined to be the value obtained by subtracting 2 from the value of the difference between the smallest size of the coding unit and the smallest size of the block allowed to be ternary split, such that the smallest size of the block allowed to be ternary split is not set to a value smaller than 16.

The decoder 1720 may determine the largest size of the coding unit, based on the information about the largest size of the coding unit obtained from the bitstream. In operation 1830, the decoder 1720 according to an embodiment may determine the largest size of the block allowed to be ternary split, by using the largest size of the coding unit and the information about the largest size of the block allowed to be ternary split.

The decoder 1720 may determine the smallest size of the coding unit, based on the information about the smallest size of the coding unit obtained from the bitstream. In operation 1840, the decoder 1720 according to an embodiment may determine the smallest size of the block allowed to be ternary split, by using the smallest size of the coding unit and the information about the smallest size of the block allowed to be ternary split.

In detail, the decoder 1720 according to an embodiment may determine the largest size of the block allowed to be ternary split, based on a value obtained by subtracting the information about the largest size of the block allowed to be ternary split from the largest size of the coding unit.

In detail, the decoder 1720 according to an embodiment may determine the smallest size of the block allowed to be ternary split, based on a value obtained by adding the information about the smallest size of the block allowed to be ternary split to the smallest size of the coding unit.

In operation S1850, the decoder 1720 according to an embodiment may determine whether to ternary split a current block, based on the largest size of the block allowed to be ternary split and the smallest size of the block allowed to be ternary split. The current block is not allowed to be ternary split, when a size of the current block is greater than the largest size of the block allowed to be ternary split or smaller than the smallest size of the block allowed to be ternary split.

In operation S1860, the decoder 1720 according to an embodiment may decode blocks generated by ternary splitting the current block, when the current block is allowed to be ternary split.

The obtainer 1710 according to an embodiment may obtain, from the bitstream, information about a largest size of a coding unit, in which a length to width ratio of a block is 1:4. The information about the largest size of the coding unit, in which the length to width ratio of the block is 1:4, the information being obtained according to an embodiment, may indicate a value of a difference between the largest size of the coding unit and the largest size of the coding unit, in which the block ratio is 1:4.

The decoder 1720 according to an embodiment may determine a largest size of a third coding unit, based on a value obtained by subtracting the information about the largest size of the coding unit, in which the block ratio is 1:4, from the largest size of the coding unit. The decoder 1720 may determine the coding unit, in which the block ratio is 1:4, by using the largest size of the coding unit, in which the block ratio is 1:4, and decode the coding unit, in which the block ratio is 1:4.

The obtainer 1710 according to another embodiment may obtain information about a smallest size of a supportable coding unit. According to another embodiment, the decoder 1720 may determine a largest size of a first coding unit, in which a length to width ratio of a block is 1:1, to be the same as the largest size of the coding unit.

The decoder 1720 according to another embodiment may determine the smallest size of the coding unit supportable by the video decoding apparatus 1700, based on a value obtained by adding 2 to the information about the smallest size of the coding unit.

The decoder 1720 according to another embodiment may determine a coding unit, in which a block ratio is 1:1, having a size equal to or smaller than a largest size and equal to or greater than a smallest size, by using the largest size of the coding unit, in which the block ratio is 1:1, and the smallest size of the block, in which the block ratio is 1:1. The decoder 1720 according to another embodiment may decode the coding unit, in which the block ratio is 1:1.

The decoder 1720 according to another embodiment may determine a coding unit, in which a block ratio is 1:4, having a size equal to or smaller than a largest size and equal to or greater than a smallest size, by using the largest size of the coding unit, in which the block ratio is 1:4, and the smallest size of the block, in which the block ratio is 1:4. The decoder 1720 according to another embodiment may decode the coding unit, in which the block ratio is 1:4.

The obtainer 1710 according to another embodiment may obtain, from the bitstream, information about a largest size of the first coding unit, in which a length to width ratio of a block is 1:1, information about a smallest size of the coding unit, in which the block ratio is 1:1, the information about the largest size of the block allowed to be ternary split, and the information about the smallest size of the block allowed to be ternary split.

The information about the largest size of the first coding unit, in which the length to width ratio of the block is 1:1, the information being obtained according to another embodiment, may indicate a value of a difference between the largest size of the coding unit and the largest size of the coding unit, in which the block ratio is 1:1. The information about the smallest size of the coding unit, in which the block ratio is 1:1, the information being obtained according to another embodiment, may indicate a value of a difference between the largest size of the coding unit, in which the block ratio is 1:1, and the smallest size of the coding unit, in which the block ratio is 1:1. The information about the largest size of the block allowed to be ternary split, obtained according to another embodiment, may indicate a value of a difference between the largest size of the coding unit, in which the block ratio is 1:1, and the largest size of the block allowed to be ternary split. The information about the smallest size of the block allowed to be ternary split, obtained according to another embodiment, may indicate a value of a difference between the smallest size of the coding unit, in which the block ratio is 1:1, and the smallest size of the block allowed to be ternary split.

Thus, the decoder 1720 according to another embodiment may determine the largest size of the block allowed to be ternary split, based on a value obtained by subtracting the information about the largest size of the block allowed to be ternary split from the largest size of the coding unit, in which the block ratio is 1:1.

The decoder 1720 according to another embodiment may determine the smallest size of the block allowed to be ternary split, based on a value obtained by adding the information about the smallest size of the block allowed to be ternary split to the smallest size of the coding unit, in which the block ratio is 1:1.

The decoder 1720 according to another embodiment may determine whether to ternary split the current block, based on the largest size of the block allowed to be ternary split and the smallest size of the block allowed to be ternary split. When the size of the current block is smaller than or equal to the largest size of the block allowed to be ternary split and equal to or greater than the smallest size, the decoder 1720 according to another embodiment may decode the blocks generated by ternary splitting the current block.

Hereinafter, a video encoding apparatus for encoding a picture by splitting the picture into blocks of various sizes and various shapes, and transmitting information about a largest size and smallest size of a block according to a block shape, will be described with reference to FIG. 19.

Figure 19:
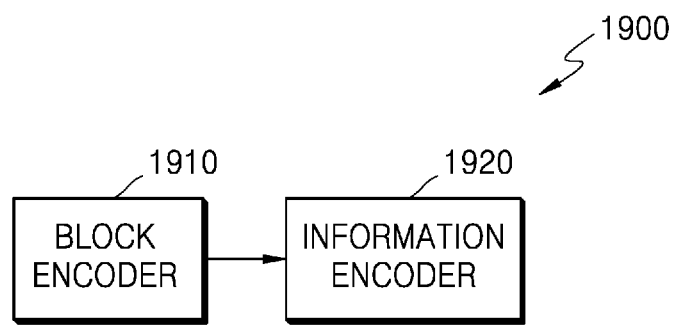
FIG. 19 is a block diagram of a video encoding apparatus according to an embodiment.

FIG. 19 is a block diagram of a video encoding apparatus according to an embodiment.

Referring to FIG. 19, a video encoding apparatus 1900 according to an embodiment may include a block encoder 1910 and an information encoder 1920.

The block encoder 1910 according to an embodiment may split a picture into coding units to encode the picture, use different processors to split the picture into one or more coding units, wherein each processor may encode the coding units. The information encoder 1920 may output syntax elements corresponding to pieces of encoding information generated as an encoding result, in a form of a bitstream.

The video encoding apparatus 1900 according to an embodiment may include a central processor (not shown) for controlling the block encoder 1910 and the information encoder 1920. Alternatively, the block encoder 1910 and the information encoder 1920 may operate respectively by their own processors (not shown), and the processors may operate systematically such that the video encoding apparatus 1900 operates as a whole. Alternatively, the block encoder 1910 and the information encoder 1920 may be controlled under control of an external processor (not shown) of the video encoding apparatus 1900.

The video encoding apparatus 1900 may include at least one data storage (not shown) storing input and output data of the block encoder 1910 and the information encoder 1920. The video encoding apparatus 1900 may include a memory controller (not shown) for controlling data input and output of the data storage.

The video encoding apparatus 1900 may perform an image encoding operation including prediction by connectively operating with an internal video encoding processor or an external video encoding processor so as to encode an image. The internal video encoding processor of the video encoding apparatus 1900 according to an embodiment may perform a basic image encoding operation when not only a separate processor but also a central processing apparatus or a graphic processing apparatus include an image encoding processing module.

The block encoder 1910 according to an embodiment may split the picture into a plurality of largest coding units, and split each largest coding unit into blocks having various sizes and various shapes for encoding.

For example, when a prediction mode of a current block is an intra mode, the block encoder 1910 may determine a reference sample among samples of a spatial neighboring block located in an intra prediction direction, by using intra prediction information of the current block, and determine prediction samples corresponding to the current block, by using the reference sample.

For example, when the prediction mode of the current block is a skip mode, the block encoder 1910 may determine a motion vector to predict the current block. The block encoder 1910 may determine a reference block in a reference picture, and determine a motion vector indicating the reference block from the current block. In the skip mode, a residual block may not need to be encoded.

For example, when the prediction mode of the current block is an inter mode, the block encoder 1910 may determine the motion vector to predict the current block. The block encoder 1910 may determine the reference block in the reference picture, and determine the motion vector indicating the reference block from the current block. The block encoder 1910 may determine a residual sample between the current blocks from reference samples included in the reference block, and generate a quantized transform coefficient by performing transform and quantization on the residual sample, based on a transform unit.

The current block is a block generated when an image is split according to a tree structure, and for example, may correspond to a largest coding unit, a coding unit, or a transform unit. The block encoder 1910 may encode the blocks included in the picture according to an encoding order.

The information encoder 1920 may output a bitstream including information about sizes of blocks having various shapes, the blocks determined as a result of encoding the blocks.

For example, the information encoder 1920 may add block shape information and/or information about a split shape mode to at least one of a sequence parameter set (SPS), a picture parameter set (PPS), a video parameter set (VPS), and a slice header. Furthermore, the information encoder 1920 may generate a bitstream by encoding a syntax element corresponding to the block shape information or the information about the split shape mode according to each largest coding unit, each reference coding unit, or each processing block.

The block encoder 1910 according to an embodiment may determine a largest size of a coding unit, a smallest size of the coding unit, a largest size of a block allowed to be ternary split, and a smallest size of the block allowed to be ternary split.

The block encoder 1910 according to an embodiment may determine whether to ternary split the current block based on the largest size of the block allowed to be ternary split and the smallest size of the block allowed to be ternary split and encode blocks generated by ternary splitting the current block.

The information encoder 1920 according to an embodiment may encode information about the largest size of the coding unit, based on the largest size of the coding unit. The information encoder 1920 according to an embodiment may encode the information about the largest size of the block allowed to be ternary split, by using the largest size of the coding unit and the largest size of the block allowed to be ternary split. The information encoder 1920 according to an embodiment may encode the information about the smallest size of the block allowed to be ternary split, by using the smallest size of the coding unit and the smallest size of the block allowed to be ternary split. The smallest size of the coding unit according to an embodiment may be pre-set.

Hereinafter, processes by which the video encoding apparatus 1900 performs video encoding such that a picture is encoded by using blocks of various sizes and shapes, and a largest size of each block shape and information about the largest size are signaled will be described with reference to FIG. 20.

Figure 20:
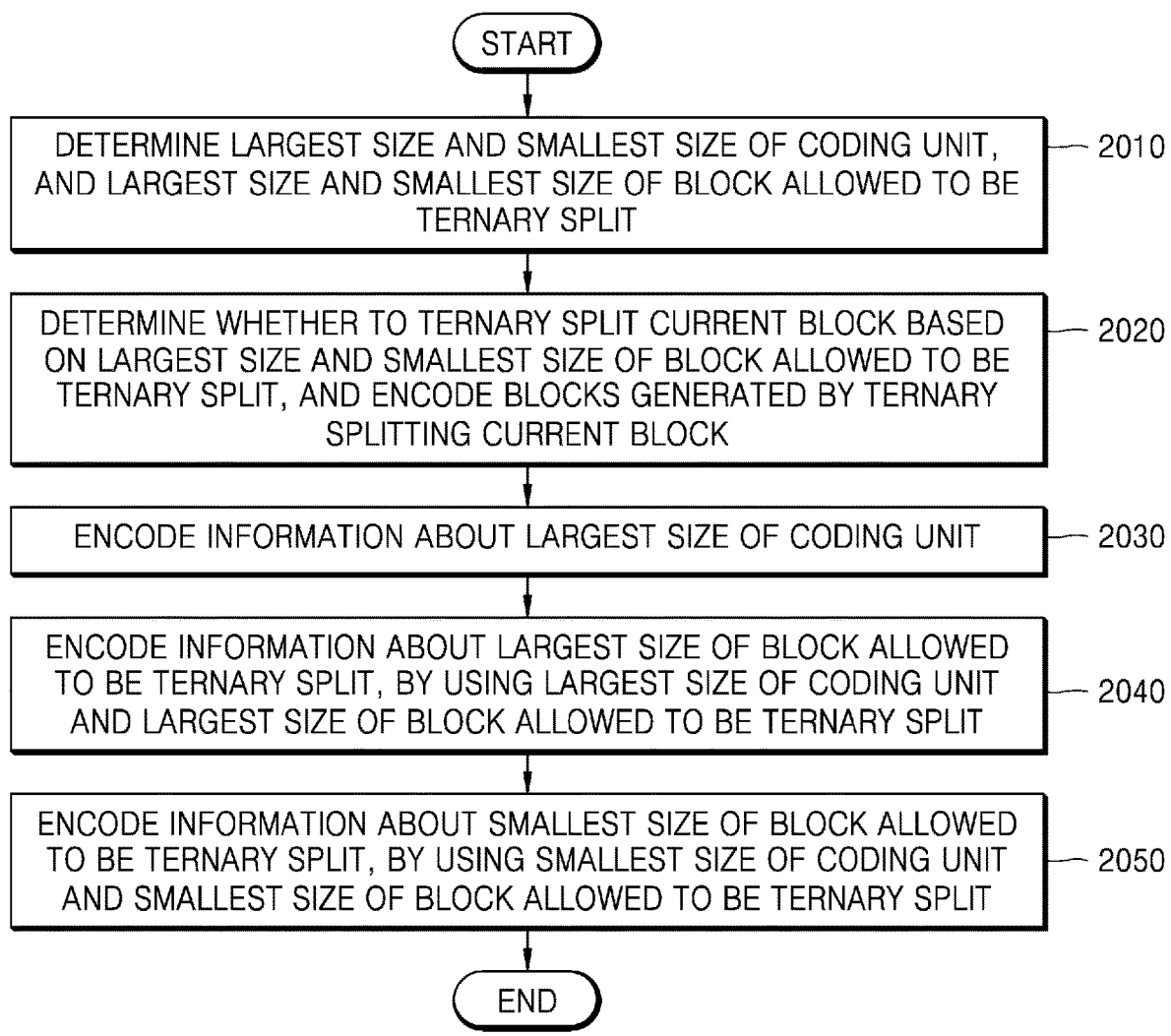
FIG. 20 is a flowchart of a video encoding method according to an embodiment.

FIG. 20 is a flowchart of a video encoding method according to an embodiment.

In operation 2010, the block encoder 1910 according to an embodiment may determine a largest size of a coding unit, a smallest size of the coding unit, a largest size of a block allowed to be ternary split, and a smallest size of the block allowed to be ternary split. A current block is not allowed to be ternary split, when a size of the current block is greater than the largest size of the block allowed to be ternary split or smaller than the smallest size of the block allowed to be ternary split.

In operation S2020, the block encoder 1910 according to an embodiment may determine whether to ternary split the current block, based on the largest size of the block allowed to be ternary split and the smallest size of the block allowed to be ternary split. When the current block is ternary split, the block encoder 1910 according to an embodiment may encode blocks generated by ternary splitting the current block.

In operation 2030, the information encoder 1920 according to an embodiment may encode information about the largest size of the coding unit, based on the largest size of the coding unit. For example, the information encoder 1920 may add the information about the largest size of the coding unit and information about the smallest size of the coding unit to a sequence parameter set.

In operation 2040, the information encoder 1920 according to an embodiment may encode the information about the largest size of the block allowed to be ternary split, by using the largest size of the coding unit and the largest size of the block allowed to be ternary split. According to an embodiment, the information about the largest size of the block allowed to be ternary split may indicate a value of a difference between the largest size of the coding unit and the largest size of the block allowed to be ternary split.

In operation 2050, the information encoder 1920 according to an embodiment may encode information about the smallest size of the block allowed to be ternary split, by using the smallest size of the coding unit and the smallest size of the block allowed to be ternary split. According to an embodiment, the information about the smallest size of the block allowed to be ternary split may indicate a value of a difference between a smallest size of the coding unit and the smallest size of the block allowed to be ternary split.

The block encoder 1910 according to an embodiment may determine a largest size of a third coding unit, in which a length to width ratio of a block is 1:4, and perform encoding by performing prediction on a coding unit, in which a block ratio is 1:4.

The block encoder 1910 according to an embodiment may determine a coding unit, in which a block ratio is 1:1, having a size equal to or smaller than a largest size and equal to or greater than a smallest size, based on the largest size of the coding unit, in which the block ratio is 1:1, and the smallest size of the block, in which the block ratio is 1:1. The block encoder 1910 according to an embodiment may encode the coding unit, in which the block ratio is 1:1, by performing prediction on the coding unit, in which the block ratio is 1:1.

The block encoder 1910 according to another embodiment may determine a coding unit, in which a block ratio is 1:2, having a size equal to or smaller than a largest size and equal to or greater than a smallest size, based on the largest size of the coding unit, in which the block ratio is 1:2, and the smallest size of the block, in which the block ratio is 1:2. The block encoder 1910 according to an embodiment may encode the coding unit, in which the block ratio is 1:2, by performing prediction on the coding unit, in which the block ratio is 1:2.

The block encoder 1910 according to another embodiment may determine a coding unit, in which a block ratio is 1:4, having a size equal to or smaller than a largest size and equal to or greater than a smallest size, based on the largest size of the coding unit, in which the block ratio is 1:4, and the smallest size of the block, in which the block ratio is 1:4. The block encoder 1910 according to an embodiment may encode the coding unit, in which the block ratio is 1:4, by performing prediction on the coding unit, in which the block ratio is 1:4.

The information encoder 1920 according to another embodiment may encode information about the largest size of the third coding unit, in which the length to width ratio of the block is 1:4, such as to indicate a value of a difference between the largest size of the coding unit and the largest size of the coding unit, in which the block ratio is 1:4.

The block encoder 1910 according to another embodiment may determine a largest size of a first coding unit, in which a length to width ratio of a block is 1:1, to be the same as the largest size of the coding unit.

The information encoder 1920 according to another embodiment may encode the information about the smallest size of the coding unit to indicate a value obtained by subtracting 2 from a logscale value of the smallest size of the coding unit.

The block encoder 1910 according to another embodiment may determine whether to ternary split the current block, based on the largest size of the block allowed to be ternary split and the smallest size of the block allowed to be ternary split. When the size of the current block is smaller than or equal to the largest size of the block allowed to be ternary split and equal to or greater than the smallest size, the block encoder 1910 according to another embodiment may encode the blocks generated via the ternary split by performing prediction on the blocks generated by ternary splitting the current block.

The information encoder 1920 according to another embodiment may encode the information about the largest size of the block allowed to be ternary split such as to indicate a value of a difference between the largest size of the coding unit, in which the block ratio is 1:1, and the largest size of the block allowed to be ternary split.

The information encoder 1920 according to another embodiment may encode the information about the smallest size of the block allowed to be ternary split such as to indicate a value of a difference between the smallest size of the coding unit, in which the block ratio is 1:1, and the smallest size of the block allowed to be ternary split.

In the video encoding apparatus 1900 and video decoding apparatus 1700, according to an embodiment, an allowable height to width ratio of a block may be differently set according to a size and split shape of the block. Hereinafter, a height to width ratio of a block will be referred to as a block ratio. Accordingly, in the video encoding apparatus 1900 and the video decoding apparatus 1700, an allowable size of a block may be differently set according to a block ratio.

Also, there may be a dependency relationship between blocks having different block ratios. For example, a smallest size of a block, in which a block ratio is 1:2 or 2:1, is greater than a size of a block, in which a block ratio is 1:1. In detail, when a smallest size of the block, in which the block ratio is 1:1, is 4×4, a smallest size of the block, in which the block ratio is 1:2 or 2:1, needs to be 8×4 or 4×8. In other words, a size of a long side of the block, in which the block ratio is 1:2 or 2:1, is 8, and a size of a long side of the block, in which the block ratio is 1:1, is 4. By using such features, the video encoding apparatus 1900 and the video decoding apparatus 1700, according to an embodiment, may signal information about a largest size and a smallest size of a block for each block ratio, by using the fact that there is a relationship between pieces of information about different block ratios.

Also, once only one of a long side and a short side of a block of a certain block ratio is identified, a length of the remaining side may be automatically determined according to the block ratio. Accordingly, in the present disclosure below, a size of a block of a certain block ratio will be referred to as a size of a long side of a block. For example, when a size of a block, in which a block ratio is 1:2 or 2:1, is 8×4 or 4×8, the size of the block, in which the block ratio is 1:2 or 2:1, will be referred to be 8.

Hereinafter, allowable sizes of a block according to a size and split shape of a block will be described with reference to FIG. 21, and FIGS. 22 through 24 illustrate information about a largest size and smallest size of a block according to a block ratio, which may be signaled between the video encoding apparatus 1900 and the video decoding apparatus 1700.

FIG. 21 shows shapes of blocks allowable in a block split tree structure, according to an embodiment.

The video encoding apparatus 1900 according to an embodiment may differently set a largest allowable size and a smallest allowable size of a block, according to a block ratio. Accordingly, the video decoding apparatus 1700 according to an embodiment may also differently set the largest allowable size and the smallest allowable size of the block, according to the block ratio.

When the block ratio is 1:1, the largest size of the block is 128 and the smallest size thereof is 4. Accordingly, allowable shapes of the block may be 128×128, 64×64, 32×32, 16×16, 8×8, or 4×4.

When the block ratio is 1:2, the largest size of the allowed block is 128 and the smallest size thereof is 8. Accordingly, the allowable shapes of the block may be 128×64, 64×128, 64×32, 32×64, 32×16, 16×32, 16×8, 8×16, 8×4, or 4×8.

When the block ratio is 1:4, the largest allowable size of the block is 64 and the smallest allowable size thereof is 16. Accordingly, the allowable shapes of the block may be 64×16, 16×64, 32×8, 8×32, 16×4, or 4×16.

When the block ratio is 1:8, the largest allowable size of the block is 64 and the smallest allowable size thereof is 32. Accordingly, the allowable shapes of the block may be 64×8, 8×64, 32×4, or 4×32.

The video encoding apparatus 1900 according to an embodiment may differently set an applicable size of a block, according to a split shape. Accordingly, the video decoding apparatus 1700 according to an embodiment may differently set the applicable size of the block, according to a split shape.

A largest size of a block in which a binary split is allowed may be 128 and a smallest size thereof may be 8. Accordingly, shapes of blocks that can be generated by the binary split may include a combination of 128×64 and 128× 64, ..., a combination of 8×4 and 8×4, and a combination of 4×4 and 4×4.

A largest size of a block in which a ternary split is allowed may be 64 and a smallest size thereof may be 16. Accordingly, shapes of blocks that can be generated by the ternary split may include a combination of 16×64, 32×64, and 16×64, ..., and a combination of 4×4, 8×4, and 4×4.

Various embodiments for the video encoding apparatus 1900 and the video decoding apparatus 1700, according to an embodiment, to signal a largest size and a smallest size of a block for each block ratio of FIG. 21 will be described below with reference to FIGS. 22 through 24. Information about the largest size and the smallest size of the block for each block ratio described below may be included in a sequence header, a picture header, or the like. Hereinafter, the pieces of information about the largest size and smallest size of the block for each block ratio, according to an embodiment in FIGS. 22 through 24, may be encoded to indicate values obtained by converting the largest size and smallest size into log scales, respectively. The information about the largest size of the block, the information about the smallest size, and the like, which are transmitted according to each embodiment, may be encoded/decoded into an unsigned exponential Golomb code, a unary code, or the like.

FIG. 22 shows information about a largest size and smallest size of a block determined according to a block ratio, according to an embodiment. The video encoding apparatus 1900 according to an embodiment may encode a largest size and smallest size of a block according to a block ratio or split method each into a value of a difference with a smallest size of a supportable block.

When the largest allowable size of the supportable block is 128 and the smallest size thereof is 4 in the video encoding apparatus 1900 according to an embodiment, a largest size of a block in which a block ratio is 1:1 may also be 128 and a smallest size thereof may also be 4. In this case, information about the smallest size of the block in which the block ratio is 1:1, according to an embodiment, may be encoded to indicate 0 (i.e., 2-2). Information about the largest size of the block in which the block ratio is 1:1, according to an embodiment, may be encoded to indicate 5 (i.e., 7−2). In other words, because values obtained by subtracting a smallest size supportable by the video encoding apparatus 1900 from the largest size and smallest size of the block in which the block ratio is 1:1 are set, the pieces of information about the largest size and smallest size of the block in which the block ratio is 1:1 may be encoded to indicate 5 and 0, instead of 7 and 2, respectively. Accordingly, the video decoding apparatus 1700 according to an embodiment may pre-identify internal information that the largest size of the supportable block is 128 and the smallest size thereof is 4. Accordingly, when a value of the obtained information about the smallest size of the block in which the block ratio is 1:1 indicates 0, the video decoding apparatus 1700 may determine that the smallest size of the block in which the block ratio is 1:1 is 4 by decoding 2 (=0+2) from 0 and inverse-converting the value 2, i.e., a log scale, into 4. Similarly, when a value of the obtained information about the largest size of the block in which the block ratio is 1:1 indicates 1, the video decoding apparatus 1700 may determine that the largest size of the block in which the block ratio is 1:1 is 128 by decoding 7 (=5+2) from 5 and inverse-converting the value 7, i.e., a log scale, into 128.

As another example, when the largest size of the supportable block is 128 and the smallest size thereof is 4 in the video encoding apparatus 1900, the largest size of the block in which the block ratio is 1:1 may be 64 and a smallest size thereof may also be 8. In this case, the information about the smallest size of the block in which the block ratio is 1:1, according to an embodiment, may be encoded to indicate 1 (i.e., 3-2). The information about the largest size of the block in which the block ratio is 1:1, according to an embodiment, may be encoded to indicate 4 (i.e., 6−2). Accordingly, when the value of the obtained information about the smallest size of the block in which the block ratio is 1:1 indicates 1, the video decoding apparatus 1700 may determine that the smallest size of the block in which the block ratio is 1:1 is 8 by decoding 3 (=1+2) from 1 and inverse-converting the value 3, i.e., a log scale, into 8. Similarly, when the value of the obtained information about the largest size of the block in which the block ratio is 1:1 indicates 4, the video decoding apparatus 1700 may determine that the largest size of the block in which the block ratio is 1:1 is 64 by decoding 6 (=4+2) from 4 and inverse-converting the value 6, i.e., a log scale, into 64.

When the largest size of the supportable block is 128 and the smallest size thereof is 4 in the video encoding apparatus 1900 according to another embodiment, a largest size of a block in which a block ratio is 1:2 may be 128 and a smallest size thereof may also be 8. In this case, information about the smallest size of the block in which the block ratio is 1:2, according to an embodiment, may be encoded to indicate 0 (i.e., 3−3). Information about the largest size of the block in which the block ratio is 1:2, according to an embodiment, may be encoded to indicate 5 (i.e., 7−2). In other words, the information about the largest size of the block in which the block ratio is 1:2 may be encoded to indicate a value obtained by subtracting a smallest size supportable by the video encoding apparatus 1900 from the largest size of the block in which the block ratio is 1:2. Here, because a smallest block in which a block ratio is 1:2 is 4×8 or 8×4, the smallest size of the block in which the block ratio is 1:2 is only 8 that is greater than a size of a supportable smallest block 4×4, i.e., a smallest size 4 of a block. Accordingly, the information about the smallest size of the block in which the block ratio is 1:2 may be encoded to indicate 0 (=3−3). Accordingly, when a value of the obtained information about the smallest size of the block in which the block ratio is 1:2 indicates 0, the video decoding apparatus 1700 may determine that the smallest size of the block in which the block ratio is 1:2 is 8 by decoding 3 (=0+3) from 0 and inverse-converting the value 3, i.e., a log scale, into 8. Similarly, when a value of the obtained information about the largest size of the block in which the block ratio is 1:2 indicates 5, the video decoding apparatus 1700 may determine that the largest size of the block in which the block ratio is 1:2 is 128 by decoding 7 (=5+2) from 5 and inverse-converting the value 7, i.e., a log scale, into 128.

Like the reason the smallest size of the block in which the block ratio is 1:2 is only 8, a smallest block in which a block ratio is 1:4 is 4×16 or 16×4, and thus a smallest size of a block in which a block ratio is 1:4 is only 16 (4 in a log scale) that is greater than 4. Similarly, a smallest block in which a block ratio is 1:8 is 4×32 or 32×4, and thus a smallest size of a block in which a block ratio is 1:8 is only 32 (5 in a log scale) that is greater than 4.

When the largest size of the supportable block is 128 and the smallest size thereof is 4 in the video encoding apparatus 1900 according to an embodiment, a largest size of a block allowed to be binary split may also be 128 and a smallest size thereof may be 8. In this case, information about the smallest size of the block allowed to be binary split, according to an embodiment, may be encoded to indicate 0 (i.e., 3−3). Information about the largest size of the block allowed to be binary split, according to an embodiment, may be encoded to indicate 5 (i.e., 7−2). In other words, the information about the largest size of the block allowed to be binary split may be encoded to indicate a value obtained by subtracting a smallest size supportable by the video encoding apparatus 1900 from the largest size of the block allowed to be binary split. On the other hand, because a size of a supportable smallest block is 4×4, a smallest block allowed to be binary split is only 4×8 or 8×4, i.e., a smallest size of the block allowed to be binary split is only 8. Accordingly, information about the smallest size of the block allowed to be binary split may be encoded to 0 (=3−3). Accordingly, when a value of the obtained information about the smallest size of the block allowed to be binary split indicates 0, the video decoding apparatus 1700 may determine that the smallest size of the block allowed to be binary split is 8 by decoding 3 (=0+3) from 0 and inverse-converting the value 3, i.e., a log scale, into 8. Similarly, when a value of the obtained information about the largest size of the block allowed to be binary split indicates 5, the video decoding apparatus 1700 may determine that the largest size of the block allowed to be binary split is 128 by decoding 7 (=5+2) from 5 and inverse-converting the value 7, i.e., a log scale, into 128.

Like the reason the smallest size of the block allowed to be binary split described is only 8 (3 in a log scale), a smallest size of a block allowed to be ternary split is only 16 (4 in a log scale).

FIG. 23 shows information about a largest size and smallest size of a block determined according to a block ratio, according to another embodiment. The video encoding apparatus 1900 according to an embodiment may encode a largest size of a block according to a block ratio or split method into a difference value with a largest size of a supportable block, and encode a smallest size of the block according to the block ratio or split method into a difference value with a smallest size of the supportable block.

When the largest size of the supportable block is 128 and the smallest size thereof is 4 in the video encoding apparatus 1900 according to an embodiment, a largest size of a block in which a block ratio is 1:1 may also be 128 and a smallest size thereof may also be 4. In this case, information about a smallest size of a block in which a block ratio is 1:1, according to an embodiment, may be encoded to indicate 0 (i.e., 2−2). Information about a largest size of the block in which the block ratio is 1:1, according to an embodiment, may be encoded to indicate 0 (i.e., 7−7). In other words, a value obtained by subtracting the largest size of the supportable block from the largest size of the block in which the block ratio is 1:1 may be encoded as the information about the largest size of the block in which the block ratio is 1:1, and a value obtained by subtracting the smallest size of the supportable block from the smallest size of the block in which the block ratio is 1:1 may be encoded as the information about the smallest size of the block in which the block ratio is 1:1. Accordingly, when a value of the obtained information about the smallest size of the block in which the block ratio is 1:1 indicates 0, the video decoding apparatus 1700 may determine that the smallest size of the block in which the block ratio is 1:1 is 4 by decoding 2 (=0+2) from 0 and inverse-converting the value 2, i.e., a log scale, into 4. Similarly, when a value of the obtained information about the largest size of the block in which the block ratio is 1:1 indicates 1, the video decoding apparatus 1700 may determine that the largest size of the block in which the block ratio is 1:1 is 128 by decoding 7 (=7−0) from 0 and inverse-converting the value 7, i.e., a log scale, into 128.

When the largest size of the supportable block is 128 and the smallest size thereof is 4 in the video encoding apparatus 1900 according to an embodiment, the largest size of the block in which a block ratio is 1:1 may be 64 and the smallest size thereof may also be 8. In this case, the information about the smallest size of the block in which the block ratio is 1:1, according to an embodiment, may be encoded to indicate 1 (i.e., 3−2). The information about the largest size of the block in which the block ratio is 1:1, according to an embodiment, may be encoded to indicate 1 (i.e., 7−6). Accordingly, when a value of the obtained information about the smallest size of the block in which the block ratio is 1:1 indicates 1, the video decoding apparatus 1700 may determine that the smallest size of the block in which the block ratio is 1:1 is 8 by decoding 3 (=1+2) from 1 and inverse-converting the value 3, i.e., a log scale, into 8. Similarly, when the value of the obtained information about the largest size of the block in which the block ratio is 1:1 indicates 1, the video decoding apparatus 1700 may determine that the largest size of the block in which the block ratio is 1:1 is 64 by decoding 6 (=7−1) from 1 and inverse-converting the value 6, i.e., a log scale, into 64.

When the largest size of the supportable block is 128 and the smallest size thereof is 4 in the video encoding apparatus 1900 according to another embodiment, a largest size of a block in which a block ratio is 1:2 may be 64 and a smallest size thereof may also be 8. In this case, information about the smallest size of the block in which the block ratio is 1:2, according to an embodiment, may be encoded to indicate 0 (i.e., 3−3). Information about the largest size of the block in which the block ratio is 1:2, according to an embodiment, may be encoded to indicate 1 (i.e., 7−6). Accordingly, when a value of the obtained information about the smallest size of the block in which the block ratio is 1:2 indicates 0, the video decoding apparatus 1700 may determine that the smallest size of the block in which the block ratio is 1:2 is 8 by decoding 3 (=3−0) from 0 and inverse-converting the value 3, i.e., a log scale, into 8. Similarly, when the value of the obtained information about the largest size of the block in which the block ratio is 1:2 indicates 1, the video decoding apparatus 1700 may determine that the largest size of the block in which the block ratio is 1:2 is 64 by decoding 6 (=7−1) from 1 and inverse-converting the value 6, i.e., a log scale, into 64.

Similarly, when the largest size of the block in which the block ratio is 1:2 is 64 and the smallest size thereof is 16, the information about the smallest size of the block in which the block ratio is 1:2 may indicate 1 (=4−3) and the information about the largest size of the block in which the block ratio is 1:2 may indicate 1 (i.e., 7−6).

As another example, when a largest size of a block in which a block ratio is 1:4 is 64 and a smallest size thereof is 16, the smallest size of the block in which the block ratio is 1:4 is only 16. Accordingly, information about the smallest size of the block in which the block ratio is 1:4 may indicate 0 (=4−4), and information about the largest size of the block in which the block ratio is 1:4 may indicate 1 (i.e., 7−6).

According to another embodiment, because a largest size of a block allowed to be binary split is 128 and a smallest size thereof is 8, information about the smallest size of the block allowed to be binary split may indicate 0 (i.e., 3−3) and information about the largest size of the block allowed to be binary split may indicate 0 (i.e., 7−7).

According to another embodiment, because a largest size of a block allowed to be ternary split is 64 and a smallest size thereof is 16, information about the smallest size of the block allowed to be ternary split may indicate 0 (i.e., 4−4) and information about the largest size of the block allowed to be ternary split may indicate 1 (i.e., 7−6).

FIG. 24 shows information about a largest size and a smallest size of a block determined according to a block ratio, according to another embodiment. The video encoding apparatus 1900 may encode information about a largest size of a block according to a block ratio or split shape to indicate a value of a difference with a largest size of a supportable block or a difference value with a largest size of a block having another block ratio. The video encoding apparatus 1900 may encode information about a smallest size of the block to indicate a value of a difference with a smallest size of the supportable block or a difference value with a smallest size of the block having the other block ratio.

When the largest size of the supportable block is 128 and the smallest size thereof is 4 in the video encoding apparatus 1900 according to another embodiment, a largest size and smallest size of a block in which a block ratio is 1:1 may be 128 and 4 respectively, a largest size and smallest size of a block in which a block ratio is 1:2 may be 64 and 4 respectively, and a largest size and smallest size of a block in which a block ratio is 1:4 may be 64 and 8 respectively. In log scales, the largest size and smallest size of the block in which the block ratio is 1:1 may be 7 and 2 respectively, the largest size and smallest size of the block in which the block ratio is 1:2 may be 6 and 2 respectively, and the largest size and smallest size of the block in which the block ratio is 1:4 may be 6 and 2 respectively.

A block ratio decreases as N in a block ratio 1:N increases. In this case, a largest size of a block having a small block ratio cannot be greater than a largest size of a block having a relatively greater block ratio, and a smallest size of the block having the smallest size cannot be smaller than a smallest size of the block having the relatively greater block ratio.

Accordingly, the video encoding apparatus 1900 may encode information about the smallest size of the block in which the block ratio is 1:2 to indicate 0 (i.e., 2−2), and information about the largest size of the block in which the block ratio is 1:2 to indicate 1 (i.e., 7−6). Also, the video encoding apparatus 1900 may encode information about the smallest size of the block in which the block ratio is 1:4 to indicate 0 (i.e., 3−3), and information about the largest size of the block in which the block ratio is 1:4 to indicate 0 (i.e., 6−6).

Accordingly, when a value of the obtained information about the smallest size of the block in which the block ratio is 1:2 indicates 0, the video decoding apparatus 1700 may determine that the smallest size of the block in which the block ratio is 1:2 is 4 by decoding 2 (=2−0) from 0 and inverse-converting the value 2, i.e., a log scale, into 4. Similarly, when the value of the obtained information about the largest size of the block in which the block ratio is 1:2 indicates 1, the video decoding apparatus 1700 may determine that the largest size of the block in which the block ratio is 1:2 is 64 by decoding 6 (=7−1) from 1 and inverse-converting the value 6, i.e., a log scale, into 64.

Similarly, when a value of the obtained information about the smallest size of the block in which the block ratio is 1:4 indicates 0, the video decoding apparatus 1700 may determine that the smallest size of the block in which the block ratio is 1:4 is 8 by decoding 3 (=3−0) from 0 and inverse-converting the value 3, i.e., a log scale, into 8. Similarly, when a value of the obtained information about the largest size of the block in which the block ratio is 1:4 indicates 0, the video decoding apparatus 1700 may determine that the largest size of the block in which the block ratio is 1:4 is 64 by decoding 6 (=6−0) from 0 and inverse-converting the value 6, i.e., a log scale, into 64.

Accordingly, the video encoding apparatus 1900 and the video decoding apparatus 1700 according to various embodiments may signal information about a largest size and smallest size of a block for each block ratio, by using dependency between largest sizes and smallest sizes of blocks according to different block ratios. Similarly, information about a largest size and smallest size of a block according to a split shape may be signaled by using dependency on a largest size and a smallest size of a supportable block. Accordingly, a bit amount for encoding/decoding information about a largest size and smallest size of a block may be reduced, and thus information about a largest size or smallest size of various blocks may be set for encoding/decoding.

Hereinafter, various embodiments of syntax elements for signaling information about a largest size and smallest size of a block for each block ratio, and information about a largest size and smallest size of a block according to a split shape will be described with reference to FIGS. 25 through 31. The video encoding apparatus 1900 may output a bitstream by encoding, in a form of syntax elements exemplified in FIGS. 25 through 31, the information about the largest size and smallest size of the block for each block ratio, and information about the largest size and smallest size of the block according to the split shape. The video decoding apparatus 1700 may obtain the syntax elements from the bitstream, and decode, from the obtained syntax elements, the information about the largest size and smallest size of the block for each block ratio, and information about the largest size and smallest size of the block according to the split shape.

FIG. 25 shows syntax elements for signaling information about a largest size and smallest size of a block, according to an embodiment.

A sequence parameter set semantic (seq_parameter_set_rbsp) shown in FIG. 25 may include syntax elements log 2_ctu_size_minus2, log 2_diff_ctu_max_11_cb, log 2_diff_max_11_min_11_cb_size, log 2_diff_max_11_max_12_cb_size, log 2_diff_min_11_min_12_cb_size_minus1, log 2_diff_max_12_max_14_cb_size, log 2_diff_min_12_min_14_cb_size_minus1, log 2_diff_max_11_max_tt_cb_size, log 2_diff_min_11_min_tt_cb_size_minus2, log 2_diff_ctu_size_max_suco_cb_size, and log 2_diff_max_suco_min_suco_cb_size. The syntax elements may indicate values obtained by log-scaling sizes of blocks.

log 2_ctu_size_minus2 may indicate a largest size of a block supported by the video encoding apparatus 1900 and the video decoding apparatus 1700, i.e., a size of a largest coding unit. "_minus2" indicates subtraction of 2 from a value of an actual largest size, and because a smallest size of a block is 4 (2 in a log scale), a value obtained by subtracting 2 from a largest size of the block may be encoded as a syntax element. For example, when a largest size of a block is 128×128, a log scale is 7 and log 2_ctu_size_minus2 may be 5.

log 2_diff_ctu_max_11_cb may indicate information about a largest size of a block (coding unit) in which a block ratio is 1:1. In detail, log 2_diff_ctu_max_11_cb is information indicating an absolute value of a value of a difference between a largest size of a supportable block and the largest size of the block in which the block ratio is 1:1. According to an embodiment, when a value of log 2_diff_ctu_max_11_cb for a current block in which a block ratio is 1:1 is less than a size of the largest coding unit, the largest coding unit may be implicitly allowed to be quad-tree split until the largest coding unit becomes a size of the current block. As another example, log 2_diff_ctu_max_11_cb may not be transmitted and the largest size of the block in which the block ratio is 1:1 may be set to be the same as the size of the largest coding unit. According to an embodiment, when the size of the largest coding unit is 7 in a log scale and the largest size of the block in which the block ratio is 1:1 is 7, log 2_diff_ctu_max_11_cb may indicate a value of 0.

log 2_diff_max_11_min_11_cb_size may indicate information about a smallest size of the block in which the block ratio is 1:1. In detail, log 2_diff_max_11_min_11_cb_size may indicate a value of a difference between the largest size and the smallest size of the block in which the block ratio is 1:1. For example, when the largest size of the block in which the block ratio is 1:1 is 7 in a log scale and the smallest size of the block in which the block ratio is 1:1 is 2 in a log scale, log 2_diff_max_11_min_11_cb_size may indicate a value of 5.

log 2_diff_max_11_max_12_cb_size may indicate information about a largest size of a block in which a block ratio is 1:2 or 2:1. In detail, log 2_diff_max_11_max_12_cb_size may indicate a value of a difference between the largest size of the block in which the block ratio is 1:1 and the largest size of the block in which the block ratio is 1:2. For example, when the largest size of the block in which the block ratio is 1:1 is 7 in a log scale and the largest size of the block in which the block ratio is 1:2 is 6 in a log scale, log 2_diff_max_11_max_12_cb_size may indicate a value of 1.

log 2_diff_min_11_min_12_cb_size_minus1 may indicate information about a smallest size of the block in which the block ratio is 1:2 or 2:1. In detail, log 2_diff_min_11_min_12_cb_size_minus1 may indicate a value of a difference between the smallest size of the block in which the block ratio is 1:1 and the smallest size of the block in which the block ratio is 1:2. Also, because the smallest size of the block in which the block ratio is 1:1 needs to be greater than the smallest size of the block in which the block ratio is 1:2, there may be at least a difference of 1 in a log scale. Accordingly, the information about the smallest size of the block in which the block ratio is 1:2 may indicate, via 'minus 1', a value obtained by subtracting 1 from the value of the difference between the smallest size of the block in which the block ratio is 1:1 and the smallest size of the block in which the block ratio is 1:2. For example, when the smallest size of the block in which the block ratio is 1:1 is 2 in a log scale and the smallest size of the block in which the block ratio is 1:2 is 3 in a log scale, log 2_diff_min_11_min_12_cb_size_minus1 may indicate a value of 0.

log 2_diff_max_12_max_14_cb_size may indicate information about a largest size of a block in which a block ratio is 1:4 or 4:1. In detail, log 2_diff_max_12_max_14_cb_size may indicate a value of a difference between the largest size of the block in which the block ratio is 1:2 or 2:1 and the largest size of the block in which the block ratio is 1:4 or 4:1. For example, when the largest size of the block in which the block ratio is 1:2 or 2:1 is 6 in a log scale and the largest size of the block in which the block ratio is 1:4 or 4:1 is 5 in a log scale, log 2_diff_max_12_max_14_cb_size may indicate a value of 1.

log 2_diff_min_12_min_14_cb_size_minus1 may indicate information about a smallest size of the block in which the block ratio is 1:4 or 4:1. In detail, log 2_diff_min_12_min_14_cb_size_minus1 may indicate a value of a difference between the smallest size of the block in which the block ratio is 1:2 or 2:1 and the smallest size of the block in which the block ratio is 1:4 or 4:1. Because the smallest size of the block in which the block ratio is 1:4 or 4:1 needs to be greater than the smallest size of the block in which the block ratio is 1:2 or 2:1, there may be a premise that there is at least a difference of 1 in a log scale. Accordingly, log 2_diff_min_12_min_14_cb_size_minus1 may indicate, via 'minus 1', a value obtained by subtracting 1 from the value of the difference between the smallest size of the block in which the block ratio is 1:2 or 2:1 and the smallest size of the block in which the block ratio is 1:4 or 4:1. For example, when the smallest size of the block in which the block ratio is 1:2 or 2:1 is 3 in a log scale and the smallest size of the block in which the block ratio is 1:4 or 4:1 is 4 in a log scale, log 2_diff_min_12_min_14_cb_size_minus1 may indicate a value of 0.

log 2_diff_max_11_max_tt_cb_size may indicate information about a largest size of a block allowed to be ternary split. In detail, log 2_diff_max_11_max_tt_cb_size may indicate a value of a difference between the largest size of the block in which the block ratio is 1:1 and the largest size of the block allowed to be ternary split. For example, when the largest size of the block in which the block ratio is 1:1 is 7 in a log scale and the largest size of the block allowed to be ternary split 6 in a log scale, log 2_diff_max_11_max_tt_cb_size may indicate a value of 1.

log 2_diff_min_11_min_tt_cb_size_minus2 may indicate information about a smallest size of the block allowed to be ternary split. In detail, log 2_diff_min_11_min_tt_cb_size_minus2 may indicate a value of a difference between the smallest size of the block in which the block ratio is 1:1 and the smallest size of the block allowed to be ternary split. Because the smallest size of the block allowed to be ternary split needs to have a value greater than the smallest size of the block in which the block ratio is 1:1 by at least two steps, there may be a premise that there may be at least a difference of 2 in a log scale. Accordingly, log 2_diff_min_11_min_tt_cb_size_minus2 may indicate, via 'minus 2', a value obtained by subtracting 2 from the value of the difference between the smallest size of the block in which the block ratio is 1:1 and the smallest size of the block allowed to be ternary split. For example, when the smallest size of the block in which the block ratio is 1:1 is 2 in a log scale and the smallest size of the block allowed to be ternary split is 4 in a log scale, log 2_diff_min_11_min_tt_cb_size_minus2 may indicate a value of 0. As another example, the information about the smallest size of the block allowed to be ternary split may be encoded by using a value of a difference between the largest size of the block allowed to be ternary split and the smallest size of the block allowed to be ternary split.

log 2_diff_ctu_size_max_suco_cb_size may indicate information about a largest size of a block in which a split unit coding unit (SUCO) is allowed. In detail, log 2_diff_ctu_size_max_suco_cb_size may indicate a value of a difference between the largest size of the block in which the block ratio is 1:1 and the largest size of the block in which SUCO is allowed. For example, when the largest size of the block in which the block ratio is 1:1 is 7 in a log scale and the largest size of the block in which SUCO is allowed is 6 in a log scale, log 2_ctu_size_max_suco_cb_size may indicate a value of 1.

log 2_diff_max_suco_min_suco_cb_size may indicate information about a smallest size of the block in which SUCO is allowed. In detail, log 2_diff_max_suco_min_suco_cb_size may indicate a value of a difference between the largest size and smallest size of the block in which SUCO is allowed. For example, when the largest size of the block in which SUCO is allowed is 6 in a log scale and the smallest size of the block in which SUCO is allowed is 4 in a log scale, log 2_diff_max_suco_min_suco_cb_size may indicate a value of 2.

The video decoding apparatus 1700 according to an embodiment may obtain the syntax elements from a syntax of FIG. 25, and determine largest sizes and smallest sizes of various blocks from the syntax elements via relational equations described with reference to FIGS. 26 and 27 below.

FIG. 26 shows relational equations for determining a size/number of largest blocks and a size/number of smallest blocks, determined according to the syntax elements of FIG. 25.

The video decoding apparatus 1700 according to an embodiment may add 2 to information about a largest size of a coding unit (log 2_ctu_size_minus2+2) to determine a log scale value (CtbLog2SizeY) of a largest size of a supportable luma block. The video decoding apparatus 1700 according to an embodiment may determine the largest size (CtbSizeY) of the luma block by bit-shifting the log scale value of the largest size of the supportable luma block to the left by 1 (1<<CtbLog2SizeY).

The video decoding apparatus 1700 according to an embodiment may determine a log scale value (MinCbLog2SizeY) of a smallest size of the supportable luma block to 2. The video decoding apparatus 1700 may determine the smallest size (MinCbSizeY) of the luma block by bit-shifting the log scale value of the smallest size of the supportable luma block to the left by 1 (1<<MinCbLog2SizeY).

The video decoding apparatus 1700 according to an embodiment may determine numbers of blocks of a largest size (largest coding units) and blocks of a smallest size (smallest coding units) present in a current picture by using syntax elements pic_width_in_luma_samples and pic_height_in_luma_samples obtained from a sequence parameter set. pic_width_in_luma_samples indicates information about a number of luma samples arranged in a line in a width direction of a picture, and pic_height_in_luma_samples indicates information about a number of luma samples arranged in a line in a height direction of the picture.

The video decoding apparatus 1700 may determine a number (PicWidthInCtbsY) of luma largest coding unit arranged in a line in the width direction of the picture by rounding up a value obtained by dividing the information about the number of luma samples arranged in a line in the width direction of the picture by the largest size of the luma block (Ceil(pic_width_in_luma_samples÷CtbSizeY)).

The video decoding apparatus 1700 may determine a number (PicHeightInCtbsY) of luma largest coding units arranged in a line in the height direction of the picture by rounding up a value obtained by dividing the information about the number of luma samples arranged in a line in the height direction of the picture by the largest size of the luma block (Ceil(pic_height_in_luma_samples÷CtbSizeY)).

The video decoding apparatus 1700 may determine a number (PicSizeInCtbsY) of luma largest coding units included in the picture by multiplying the number of luma largest coding units arranged in a line in the width direction of the picture by the number of luma largest coding units arranged in a line in the height direction of the picture ((PicWidthInCtbsY*PicHeightInCtbsY).

The video decoding apparatus 1700 may determine a number (PicWidthInMinCbsY) of luma smallest coding units arranged in a line in the width direction of the picture by dividing the information about the number of luma samples arrange in a line in the width direction of the picture by a smallest size of the luma block (pic_width_in_luma_samples/MinCbSizeY).

The video decoding apparatus 1700 may determine a number (PicHeightInMinCbsY) of luma smallest coding units arranged in a line in the height direction of the picture by dividing the information about the number of luma samples arranged in a line in the height direction of the picture by the smallest size of the luma block (pic_height_in_luma_samples/MinCbSizeY).

The video decoding apparatus 1700 may determine a number (PicSizeInMinCbsY) of luma smallest coding units included in the picture by multiplying the number of luma smallest coding units arranged in a line in the width direction of the picture and the number of luma smallest coding units arranged in a line in the height direction of the picture (PicWidthInMinCbsY*PicHeightInMinCbsY).

The video decoding apparatus 1700 may determine a number (PicSizeInSamplesY) of luma samples included in the picture by multiplying information about the number of luma samples arranged in a line in the width direction of the picture and information about the number of luma samples arranged in a line in the height direction of the picture (pic_width_in_luma_samples pic_height_in_luma_samples).

The video decoding apparatus 1700 may determine a number (PicWidthInSamplesC) of chroma samples arranged in a line in the width direction of the picture by dividing the information about the number of luma samples arranged in a line in the width direction of the picture by a width of a chroma sub-block (pic_width_in_luma_samples/SubWidthC).

The video decoding apparatus 1700 may determine a number (PicHeightInSamplesC) of chroma samples arranged in a line in the height direction of the picture by dividing the information about the number of luma samples arranged in a line in the height direction of the picture by a height of the chroma sub-block (pic_height_in_luma_samples/SubHeightC).

FIG. 27 shows relational equations for determining largest sizes and smallest sizes of blocks according to block ratios, according to the syntax elements of FIG. 25.

The video decoding apparatus 1700 may determine a log scale value (MaxCbLog2Size11Ratio) of a largest size of a block in which a block ratio is 1:1 by subtracting information about the largest size of the block in which the block ratio is 1:1 from a log scale value of a largest size of a supportable luma block (CtbLog2SizeY–log 2_diff_ctu_max_11_cb_size).

The video decoding apparatus 1700 may determine a log scale value (MinCbLog2Size11Ratio) of a smallest size of the block in which the block ratio is 1:1 by subtracting information about the smallest size of the block in which the block ratio is 1:1 from the log scale value of the largest size of the block in which the block ratio is 1:1 (MaxCbLog2Size11Ratio–log 2_diff_max_11_min_11_cb_size).

The video decoding apparatus 1700 may determine a log scale value (MaxCbLog2Size12Ratio) of a largest size of a block in which a block ratio is 1:2 by subtracting information about the largest size of the block in which the block ratio is 1:2 from the log scale value of the largest size of the block in which the block ratio is 1:1 (MaxCbLog2Size11Ratio–log 2_diff_max_11_max_12_cb_size).

The video decoding apparatus 1700 may determine a log scale value (MinCbLog2Size12Ratio) of a smallest size of the block in which the block ratio is 1:2 by adding the log scale value of the smallest size of the block in which the block ratio is 1:1 and information about the smallest size of the block in which the block ratio is 1:2 and then adding 1 to a result thereof (MinCbLog2Size11Ratio+log 2_diff_min_11_min_12_cb_size_minus1+1).

The video decoding apparatus 1700 may determine a log scale value (MaxCbLog2Size14Ratio) of a largest size of a block in which the block ratio is 1:4 by subtracting information about the largest size of the block in which the block ratio is 1:4 from the log scale value of the largest size of the block in which the block ratio is 1:2 (MaxCbLog2Size12Ratio–log 2_diff_max_12_max_14_cb_size).

The video decoding apparatus 1700 may determine a log scale value (MinCbLog2Size14Ratio) of a smallest size of the block in which the block ratio is 1:4 by adding the log scale value of the smallest size of the block in which the block ratio is 1:2 and information about the smallest size of the block in which the block ratio is 1:4 and then adding 1 to a result thereof (MinCbLog2Size12Ratio+log 2_diff_min_12_min_14_cb_size_minus1+1).

The video decoding apparatus 1700 may determine a log scale value (MaxTtLog2Size) of a largest size of a block allowed to be ternary split by subtracting information about the largest size of the block allowed to be ternary split from the log scale value of the largest size of the block in which the block ratio is 1:1 (MaxCbLog2Size11Ratio–log 2_diff_max_11_max_tt_cb_size).

The video decoding apparatus 1700 may determine a log scale value (MinTtLog2Size) of a smallest size of the block allowed to be ternary split by adding the log scale value of the smallest size of the block in which the block ratio is 1:1, information about the log scale value of the smallest size of the block allowed to be ternary split, and 2 (MinCbLog2Size11Ratio+log 2_diff_min_11_min_tt_cb_size_minus2+2).

FIG. 28 shows relational equations for determining largest sizes and smallest sizes of blocks on which SUCO is performed according to the syntax elements of FIG. 25.

The video decoding apparatus 1700 may determine a log scale value (MaxSucoLog2Size) of a largest size of a block in which SUCO is allowed by subtracting information about the largest size of the block in which the SUCO is allowed from a log scale value of a largest size of a supportable luma block (CtbLog2SizeY–log 2_diff_ctu_size_max_suco_cb_size).

The video decoding apparatus 1700 may determine a log scale value (MinSucoLog2Size) of a smallest size of the block in which the SUCO is allowed by subtracting information about the smallest size of the block in which the SUCO is allowed from the log scale value of the largest size of the block in which the SUCO is allowed (MaxSucoLog2Size–log 2_diff_max_suco_min_suco_cb_size).

Hereinafter, an embodiment of determining, by the video decoding apparatus 1700 according to another embodiment, a largest size and a smallest size of a block for each block ratio by using syntax elements obtained from a sequence parameter set will be described with reference to FIGS. 29 through 31.

FIG. 29 shows syntax elements for signaling information about a largest size and a smallest size of a block, according to another embodiment.

A sequence parameter semantic shown in FIG. 29 may include syntax elements log 2_ctu_size_minus5, log 2_min_cb_size_minus2, log 2_diff_ctu_max_14_cb_size, log 2_diff_ctu_max_tt_cb_size, and log 2_diff_min_cb_min_tt_cb_size_minus2. The syntax elements may indicate values obtained by log-scaling sizes of blocks.

log 2_ctu_size_minus5 may indicate a largest size of a block supported by the video encoding apparatus 1900 and the video decoding apparatus 1700, i.e., a size of a largest coding unit. "_minus5" may indicate subtraction of 5 from a value of an actual largest size. For example, when a largest size of a block is 128×128, a log scale is 7 and log 2_ctu_size_minus5 may be 2.

log 2_min_cb_size_minus2 may indicate a smallest size of the block supported by the video encoding apparatus 1900 and the video decoding apparatus 1700, i.e., a size of a smallest coding unit. In detail, log 2_min_cb_size_minus2 may be information indicating a value obtained by subtracting 2 from the smallest size of the supportable block. For example, when a smallest size of a largest coding unit is 2 in a log scale, log 2_min_cb_size_minus2 may indicate a value of 2.

log 2_diff_ctu_max_14_cb_size may indicate information about a largest size of a block in which a block ratio is 1:4. In detail, log 2_diff_ctu_max_14_cb_size is information indicating a difference value between the largest size of the supportable block and the largest size of the block in which the block ratio is 1:4. For example, when a size of the largest coding unit is 7 in a log scale and the largest size of the block in which the block ratio is 1:4 is 5 in a log scale, log 2_diff_ctu_max_14_cb_size may indicate a value of 2.

log 2_diff_ctu_max_tt_cb_size may indicate information about a largest size of a block allowed to be ternary split. In detail, log 2_diff_ctu_max_tt_cb_size is information indicating a difference value between the largest size of the supportable block and the largest size of the block allowed to be ternary split. For example, when the size of the largest coding unit is 7 in a log scale and the largest size of the block allowed to be ternary split is 6 in a log scale, log 2_diff_ctu_max_tt_cb_size may indicate a value of 1.

log 2_diff_min_cb_min_tt_cb_size_minus2 may indicate information about a smallest size of the block allowed to be ternary split. In detail, log 2_diff_min_cb_min_tt_cb_size_minus2 is information indicating a value of a difference between the smallest size of the supportable and the smallest size of the block allowed to be ternary split. "_minus2" may indicate subtraction of 2 from a value of an actual largest size. For example, when the largest size of the block allowed to be ternary split is 6 in a log scale and the smallest size of the block allowed to be ternary split is 4 in a log scale, log 2_diff_min_cb_min_tt_cb_size_minus2 may indicate a value of 2.

The video decoding apparatus 1700 according to another embodiment may obtain the syntax elements from a syntax of FIG. 29, and determine largest sizes and smallest sizes of various blocks from the syntax elements via relational equations described with reference to FIGS. 30 and 31 below.

FIG. 30 shows relational equations for determining a size/number of largest blocks and a size/number of smallest blocks, determined according to the syntax elements of FIG. 29.

The video decoding apparatus 1700 according to another embodiment may add 5 to information about a largest size of a block (log 2_ctu_size_minus5+5) to determine a log scale value (CtbLog2SizeY) of a largest size of a supportable luma block. The video decoding apparatus 1700 may determine the largest size (CtbSizeY) of the luma block by bit-shifting the log scale value of the largest size of the supportable luma block to the left by 1 (1<<CtbLog2SizeY).

The video decoding apparatus 1700 according to another embodiment may determine numbers of blocks of a largest size (largest coding units) and blocks of a smallest size (smallest coding units) present in a current picture by using syntax elements pic_width_in_luma_samples and pic_height_in_luma_samples obtained from a sequence parameter set. pic_width_in_luma_samples indicates information about a number of luma samples arranged in a line in a width direction of a picture, and pic_height_in_luma_samples indicates information about a number of luma samples arranged in a line in a height direction of the picture.

The video decoding apparatus 1700 may determine a number (PicWidthInCtbsY) of luma largest coding unit arranged in a line in the width direction of the picture by rounding up a value obtained by dividing the information about the number of luma samples arranged in a line in the width direction of the picture by the largest size of the luma block (Ceil(pic_width_in_luma_samples CtbSizeY)).

The video decoding apparatus 1700 may determine a number (PicHeightInCtbsY) of luma largest coding units arranged in a line in the height direction of the picture by rounding up a value obtained by dividing the information about the number of luma samples arranged in a line in the height direction of the picture by the largest size of the luma block (Ceil(pic_height_in_luma_samples CtbSizeY)).

The video decoding apparatus 1700 may determine a number (PicSizeInCtbsY) of luma largest coding units included in the picture by multiplying the number of luma largest coding units arranged in a line in the width direction of the picture by the number of luma largest coding units arranged in a line in the height direction of the picture ((PicWidthInCtbsY*PicHeightInCtbsY).

The video decoding apparatus 1700 may determine a number (PicWidthInMinCbsY) of luma smallest coding units arranged in a line in the width direction of the picture by dividing the information about the number of luma samples arranged in a line in the width direction of the picture by a smallest size of the luma block (pic_width_in_luma_samples/MinCbSizeY).

The video decoding apparatus 1700 may determine a number (PicHeightInMinCbsY) of luma smallest coding units arranged in a line in the height direction of the picture by dividing the information about the number of luma samples arranged in a line in the height direction of the picture by the smallest size of the luma block (pic_height_in_luma_samples/MinCbSizeY).

The video decoding apparatus 1700 may determine a number (PicSizeInMinCbsY) of luma smallest coding units included in the picture by multiplying the number of luma smallest coding units arranged in a line in the width direction of the picture and the number of luma smallest coding units arranged in a line in the height direction of the picture (PicWidthInMinCbsY*PicHeightInMinCbsY).

The video decoding apparatus 1700 may determine a number (PicSizeInSamplesY) of luma samples included in the picture by multiplying information about the number of luma samples arranged in a line in the width direction of the picture and information about the number of luma samples arranged in a line in the height direction of the picture (pic_width_in_luma_samples pic_height_in_luma_samples).

The video decoding apparatus 1700 may determine a number (PicWidthInSamplesC) of chroma samples arranged in a line in the width direction of the picture by dividing the information about the number of luma samples arranged in a line in the width direction of the picture by a width of a chroma sub-block (pic_width_in_luma_samples/SubWidthC).

The video decoding apparatus 1700 may determine a number (PicHeightInSamplesC) of chroma samples arranged in a line in the height direction of the picture by dividing the information about the number of luma samples arranged in a line in the height direction of the picture by a height of the chroma sub-block (pic_height_in_luma_samples/SubHeightC).

The video decoding apparatus 1700 may determine a log scale value (MinCbLog2SizeY) of a smallest size of the supportable luma block to be a value obtained by adding 2 to the information about the smallest size of the supportable luma block (2+log 2_min_cb_size_minus2). The video decoding apparatus 1700 may determine the smallest size of the supportable luma block by bit-shifting the log scale value of the smallest size of the supportable luma block to the left by 1 (MinCbSizeY=1<<MinCbLog2SizeY).

The video decoding apparatus 1700 may determine a number (PicWidthInMinCbsY) of luma smallest coding units arranged in a line in the width direction of the picture by dividing the information about the number of luma samples arranged in a line in the width direction of the picture by a smallest size of the luma block (pic_width_in_luma_samples/MinCbSizeY).

The video decoding apparatus 1700 may determine a number (PicHeightInMinCbsY) of luma smallest coding units arranged in a line in the height direction of the picture by dividing the information about the number of luma samples arranged in a line in the height direction of the picture by the smallest size of the luma block (pic_height_in_luma_samples/MinCbSizeY).

The video decoding apparatus 1700 may determine a number (PicSizeInMinCbsY) of luma smallest coding units included in the picture by multiplying the number of luma smallest coding units arranged in a line in the width direction of the picture and the number of luma smallest coding units arranged in a line in the height direction of the picture (PicWidthInMinCbsY*PicHeightInMinCbsY).

FIG. 31 shows relational equations for determining largest sizes and smallest sizes of blocks according to block ratios, according to the syntax elements of FIG. 29.

The video decoding apparatus 1700 may determine a log scale value (MinCbLog2Size11Ratio) of a smallest size of a block in which a block ratio is 1:1 to be the same as a log scale value (MinCbLog2SizeY) of a smallest size of a supportable luma block.

The video decoding apparatus 1700 may determine a log scale value (MinCbLog2Size12Ratio) of a smallest size of a block in which a block ratio is 1:2 by adding 1 to the log scale value of the smallest size of the block in which the block ratio is 1:1 (MinCbLog2Size11Ratio+1).

The video decoding apparatus 1700 may determine a log scale value (MinCbLog2Size14Ratio) of a smallest size of a block in which a block ratio is 1:4 to be a value (MinCbLog2Size12Ratio+1) obtained by adding 1 to the log scale value of the smallest size of the block in which the block ratio is 1:2.

The video decoding apparatus 1700 may determine a log scale value (MaxTtLog2Size) of a largest size of a block allowed to be ternary split to be a smaller value among 6 and a value obtained by subtracting information about the largest size of the block allowed to be ternary split from the log scale value of the largest size of the supportable luma block (Min(CtbLog2SizeY−log 2_diff_ctu_max_tt_cb_size, 6)).

The video decoding apparatus 1700 may determine a log scale value (MinTtLog2Size) of a smallest size of the block allowed to be ternary split to be a value (MinCbLog2SizeY+log 2_diff_min_cb_min_tt_cb_size_minus2+2) obtained by adding the log scale value of the smallest size of the supportable luma block, information about the smallest size of the block allowed to be ternary split, and 2.

Meanwhile, the embodiments of the present disclosure described above may be written as computer-executable programs that may be stored in a medium.

The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. The machine-readable storage medium may be provided in the form of a non-transitory storage medium. Here, the 'non-transitory storage medium' only denotes a tangible device and does not contain a signal (for example, electromagnetic waves). This term does not distinguish a case where data is stored in the storage medium semi-permanently and a case where the data is stored in the storage medium temporarily. For example, the 'non-transitory storage medium' may include a buffer where data is temporarily stored.

Other examples of the medium include recording media and storage media managed by application stores distributing applications or by websites, servers, and the like supplying or distributing other various types of software.

According to an embodiment, a method according to various embodiments of the present disclosure may be provided by being included in a computer program product. The computer program products are products that can be traded between sellers and buyers. The computer program product may be distributed in a form of machine-readable storage medium (for example, a compact disc read-only memory (CD-ROM)), or distributed (for example, downloaded or uploaded) through an application store (for example, Play Store™) or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

While one or more embodiments of the present disclosure have been described with reference to the figures, it will be understood by those of ordinary skill in the art that various changes in form and details may be made therein without departing from the spirit and scope as defined by the following claims.

The invention claimed is:

1. A video decoding method comprising:
    determining a largest size of a coding unit, by using information about the largest size of the coding unit, the information being obtained from a bitstream;
    obtaining, from the bitstream, information about a largest size of a block allowed to be ternary split, information about a smallest size of the block allowed to be ternary split, and information about a largest size of a coding unit with a height width ratio of 1:4;
    determining the largest size of the block allowed to be ternary split, by using the largest size of the coding unit and the information about the largest size of the block allowed to be ternary split;
    determining the smallest size of the block allowed to be ternary split, by using a smallest size of the coding unit and the information about the smallest size of the block allowed to be ternary split;

determining the largest size of the coding unit with the height width ratio of 1:4 by using the information about the largest size of the coding unit with the height width ratio of 1:4;

determining the smallest size of the coding unit with the height width ratio of 1:4 from the smallest size of the coding unit;

determining whether to allow ternary split of a first coding unit, based on the largest size of the block allowed to be ternary split, the smallest size of the block allowed to be ternary split, the largest size of the coding unit with the height width ratio of 1:4 and the smallest size of the coding unit with the height width ratio of 1:4;

when the ternary split of the first coding unit is allowed, generating second coding units with the height width ratio of 1:4 by ternary splitting the first coding unit and decoding the second coding units; and when the first coding unit is not split into smaller coding units, decoding the first coding unit.

2. A video encoding method comprising:

determining a largest size of a coding unit, a smallest size of the coding unit, a largest size of a block allowed to be ternary split, a smallest size of the block allowed to be ternary split, a largest size of a coding unit with a height width ratio of 1:4, and a smallest size of the coding unit with the height width ratio of 1:4;

determining whether to allow ternary split of a first coding unit, based on the largest size of the block allowed to be ternary split, the smallest size of the block allowed to be ternary split, the largest size of the coding unit with the height width ratio of 1:4 and the smallest size of the coding unit with the height width ratio of 1:4;

when the ternary split of the first coding unit is allowed, generating second coding units with the height width ratio of 1:4 by ternary splitting the first coding unit and encoding the second coding units;

when the first coding unit is not split into smaller coding units, encoding the first coding unit;

encoding information about the largest size of the coding unit, based on the largest size of the coding unit;

encoding information about the largest size of the block allowed to be ternary split, by using the largest size of the coding unit and the largest size of the block allowed to be ternary split;

encoding information about the smallest size of the block allowed to be ternary split, by using the smallest size of the coding unit and the smallest size of the block allowed to be ternary split; and encoding information about the largest size of the coding unit with the height width ratio of 1:4 by using the largest size of the coding unit with the height width ratio of 1:4.

3. A method of storing a bitstream into a non-transitory computer-readable storage medium, the method comprising:

determining a largest size of a coding unit, a smallest size of the coding unit, a largest size of a block allowed to be ternary split, a smallest size of the block allowed to be ternary split, a largest size of a coding unit with a height width ratio of 1:4, and a smallest size of the coding unit with the height width ratio of 1:4;

determining whether to allow ternary split of a first coding unit, based on the largest size of the block allowed to be ternary split, the smallest size of the block allowed to be ternary split, the largest size of the coding unit with the height width ratio of 1:4 and the smallest size of the coding unit with the height width ratio of 1:4;

when the ternary split of the first coding unit is allowed, generating second coding units with the height width ratio of 1:4 by ternary splitting the first coding unit and encoding the second coding units;

when the first coding unit is not split into smaller coding units, encoding the first coding unit;

encoding information about the largest size of the coding unit, based on the largest size of the coding unit;

encoding information about the largest size of the block allowed to be ternary split, by using the largest size of the coding unit and the largest size of the block allowed to be ternary split; and encoding information about the smallest size of the block allowed to be ternary split, by using the smallest size of the coding unit and the smallest size of the block allowed to be ternary split;

encoding information about the largest size of the coding unit with the height width ratio of 1:4 by using the largest size of the coding unit with the height width ratio of 1:4; and storing, into the non-transitory computer-readable storage medium, the bitstream including the information about the largest size of the block allowed to be ternary split, the information about the smallest size of the block allowed to be ternary split and the information about the largest size of the coding unit with the height width ratio of 1:4.

* * * * *